United States Patent [19]

Yu

[11] Patent Number: 5,742,706

[45] Date of Patent: Apr. 21, 1998

[54] METHOD AND APPARATUS FOR COMPARISON OF DATA STRINGS

[75] Inventor: Francis H. Yu, Gainesville, Fla.

[73] Assignee: Oracle Corporation, Redwood Shores, Calif.

[21] Appl. No.: 568,557

[22] Filed: Dec. 7, 1995

Related U.S. Application Data

[63] Continuation of Ser. No. 372,804, Dec. 23, 1994, abandoned, which is a continuation of Ser. No. 848,833, Mar. 10, 1992, abandoned.

[51] Int. Cl.$^6$ .................................................. G06K 9/72
[52] U.S. Cl. ........................... 382/229; 395/606; 395/795
[58] Field of Search ................................. 382/209, 182, 382/205, 206, 227, 229, 276, 278, 309, 310, 231; 364/715.04, 715.09, 715.11, 419.12; 395/2, 51, 54, 606, 612, 795; 434/167

[56] References Cited

U.S. PATENT DOCUMENTS

| | | | |
|---|---|---|---|
| 3,803,553 | 4/1974 | Nakano et al. | 382/28 |
| 3,995,254 | 11/1976 | Rosenbaum | 382/40 |
| 4,489,435 | 12/1984 | Moshier | 395/2 |
| 4,648,031 | 3/1987 | Jenner | 364/200 |
| 4,698,751 | 10/1987 | Parvin | 364/200 |
| 4,760,523 | 7/1988 | Yu et al. | 364/200 |
| 4,845,610 | 7/1989 | Parvin | 364/200 |
| 4,905,162 | 2/1990 | Hartzband et al. | 364/513 |
| 4,926,488 | 5/1990 | Nadas et al. | 381/41 |
| 4,979,227 | 12/1990 | Mittelbach et al. | 382/40 |
| 4,985,863 | 1/1991 | Fujisawa et al. | 364/900 |
| 5,008,818 | 4/1991 | Bocast | 364/200 |
| 5,033,097 | 7/1991 | Nakamura | 382/9 |
| 5,060,143 | 10/1991 | Lee | 364/200 |
| 5,109,431 | 4/1992 | Nishiya et al. | 382/30 |

*Primary Examiner*—Leo Boudreau
*Assistant Examiner*—Phuoc Tran
*Attorney, Agent, or Firm*—Blakely, Sokoloff, Taylor & Zafman

[57] ABSTRACT

The present invention is a method and apparatus that measures the similarity of two images. Any information that can be discretely symbolized can be transformed into an image through so-called "image projection". This process is used to define otherwise discrete entities as part of a linear space, making it possible to calculate distances among those entities. A mechanism called a cluster allows association of otherwise discrete symbols, improving the matching abilities of the invention. Initially, the sequence of symbols is normalized. Then, a projection of the normalized sequence is created. The projection may be optionally generated with a cluster that assigns weights to the neighbors of a core symbol and/or with position weights that assigns weights to each position in the normalized image. Projection matching is then performed to determine match candidates for the string of symbols.

62 Claims, 9 Drawing Sheets

METHOD AND APPARATUS FOR COMPARISON OF DATA STRINGS

This is a continuation of application Ser. No. 08/372,804, filed Dec. 23, 1994, now abandoned, which is a continuation of application Ser. No. 07/848,833, filed Mar. 10, 1992, now abandoned.

BACKGROUND OF THE PRESENT INVENTION

1. Field of the Invention

This invention relates to the field of data comparison.

2. Background Art

In data storage systems or data base systems, it is often desired to retrieve blocks of data in response to a query. In other cases, an unknown block of data is compared with stored blocks of data as a means of identifying the unknown block of data. In some cases, there is no stored block of data in the data base that matches the query. Similarly, there may be no matching stored block of data for a given unknown block of data. However, it may be useful to provide information about the blocks of data that are closest to matching the query block of data. This is particularly true in spell check programs where a word is misspelled and the most likely replacement word is to be determined. A system for determining the best match for a particular block of data is known as a word comparator, string matching scheme, or matching algorithm.

In the prior art, such matching is accomplished by relatively straightforward algorithms that seek to identify common characters or symbols between two strings. For example, a "left-to-right" comparison of two strings is performed until common characters are found. The common characters are then aligned and a "right-to-left" comparison is performed. This algorithm only identifies typographic differences between two strings.

There are prior art patents that describe matching schemes that include methods for determining the degree of similarity between two strings. Both Parvin 4,698,751 and Parvin 4,845,610 describe a string to string matching method in which a "distance" between the two strings is calculated. "Distance" in Parvin is defined as the minimum number of editing operations (such as adding a character, deleting a character and substituting for a character) needed to convert one string to the other.

Yu et al., U.S. Pat. No. 4,760,523, describes a "fast search processor" for searching for a predetermined pattern of characters. The processor includes serially connected cells each of which contain a portion of the pattern. The character set being searched is sent in a serial fashion through the serially connected cells. Match indicators record each match between the pattern in a cell and the character stream flowing through the cell.

Hartzband et al., U.S. Pat. No. 4,905,162 describes a method for determining the similarity between objects having characteristics that are specified on a reference table. Weights for each characteristic may be specified by a user. A numerical value for the similarity between objects is calculated based on an element by element comparison of each characteristic.

U.S. Pat. No. 4,979,227 to Mittelbach et al. describes a method, in an optical character recognition context, for recognizing a character string by comparing the string to a lexicon of acceptable character strings. The best matching character strings from the lexicon are selected, and tested to see whether substitutions that would convert the original string to the lexicon string are permitted. An example of a permitted substitution would be substituting a "1" for an "i", since these characters are similar in appearance. The actual comparison process is not described in this patent.

Fujisawa et al., U.S. Pat. No. 4,985,863 describes a document storage and retrieval system in which both image and text flies of the document are stored in memory. The desired image file is selected by searching the associated text file. The text file, which may be generated by optical character recognition methods applied to the image files, contains special characters that indicate ambiguous characters. Possible alternatives may be provided for an ambiguous character. For example, if a character is recognized as being possibly an "o" or an "a", both these characters are listed together with the special characters indicating the existence of an ambiguity.

U.S. Pat. No. 5,008,818 to Bocast describes a method and apparatus for reconstructing altered data strings by comparing an unreconstructed string to "vocabulary" strings. The comparison is done on a character by character basis by moving pointers from the beginning to the end of the unconstructed string, one of the pointers indicating the character being compared, the second acting as a counter for the number of correct comparisons. The comparison is under certain conditions also done from the back to the front of the string. A "reconstruction index" indicating the similarity between the unconstructed string and the vocabulary string is calculated from the positions of the pointers.

U.S. Pat. No. 5,060,143 to Lee describes a method for comparing strings of characters by comparing a target string to sequential blocks of candidate strings. By comparing the target string to sequential portions of the candidate strings, rather than to the candidate string as a whole, performance is improved by eliminating redundant comparisons. An early "time out" feature determines early during the comparison process whether the candidate string can possibly be a valid match. If not, the comparison to that candidate string is aborted and a comparison to the first block of the next candidate string is begun.

SUMMARY OF THE PRESENT INVENTION

The present invention is a method and apparatus that measures the similarity of two images. Any information that can be discretely symbolized can be transformed into an image through so-called "image projection". This process is used to define otherwise discrete entities as part of a linear space, making it possible to calculate distances among those entities. A mechanism called a cluster allows association of otherwise discrete symbols, improving the matching abilities of the invention. Cluster tables are created that reflect symbol relationships. By adjusting the cluster tables, the outcome of similarity ranking can be controlled.

The invention is used to measure the similarity between two strings of symbols. The invention generates scaled scores that represent the degree of matching between two vectors. The invention can be used as a spelling correction tool, a phonetic matching scheme, etc.

The process of image projection transforms a string into a real-valued vector. When searching for best matches in a large space, projection vectors can be used to create an index in the search space. With a proper indexing method, the best matches for a query can be found in the same time as required to search for an exact match.

The present invention operates in several steps. Initially, the sequence of symbols is normalized. Then, a projection of the normalized sequence is created. The projection may optionally be generated with a cluster that assigns weights to the neighbors of a core symbol and/or with position weights that assigns weights to each position in the normalized image. Projection matching is then performed to determine match candidates for the string of symbols.

DETAILED DESCRIPTION OF THE INVENTION

A method and apparatus for comparing data strings is described. In the following description, numerous specific details, such as normalization values, weight values, etc., are described in order to provide a more thorough description of the present invention. It will be apparent, however, to one skilled in the art, that the present invention may be practiced without these specific details. In other instances well known features have not been described in detail so as not to obscure the present invention.

The present invention operates as follows:

1. Normalize sequence of symbols.
2. Create projection of normalized sequence. (Optionally with a cluster that assigns weights to the neighbors of a core symbol and/or with position weights that assign weights to each position in the normalized image.)
3. Perform projection matching.

Figure 4:
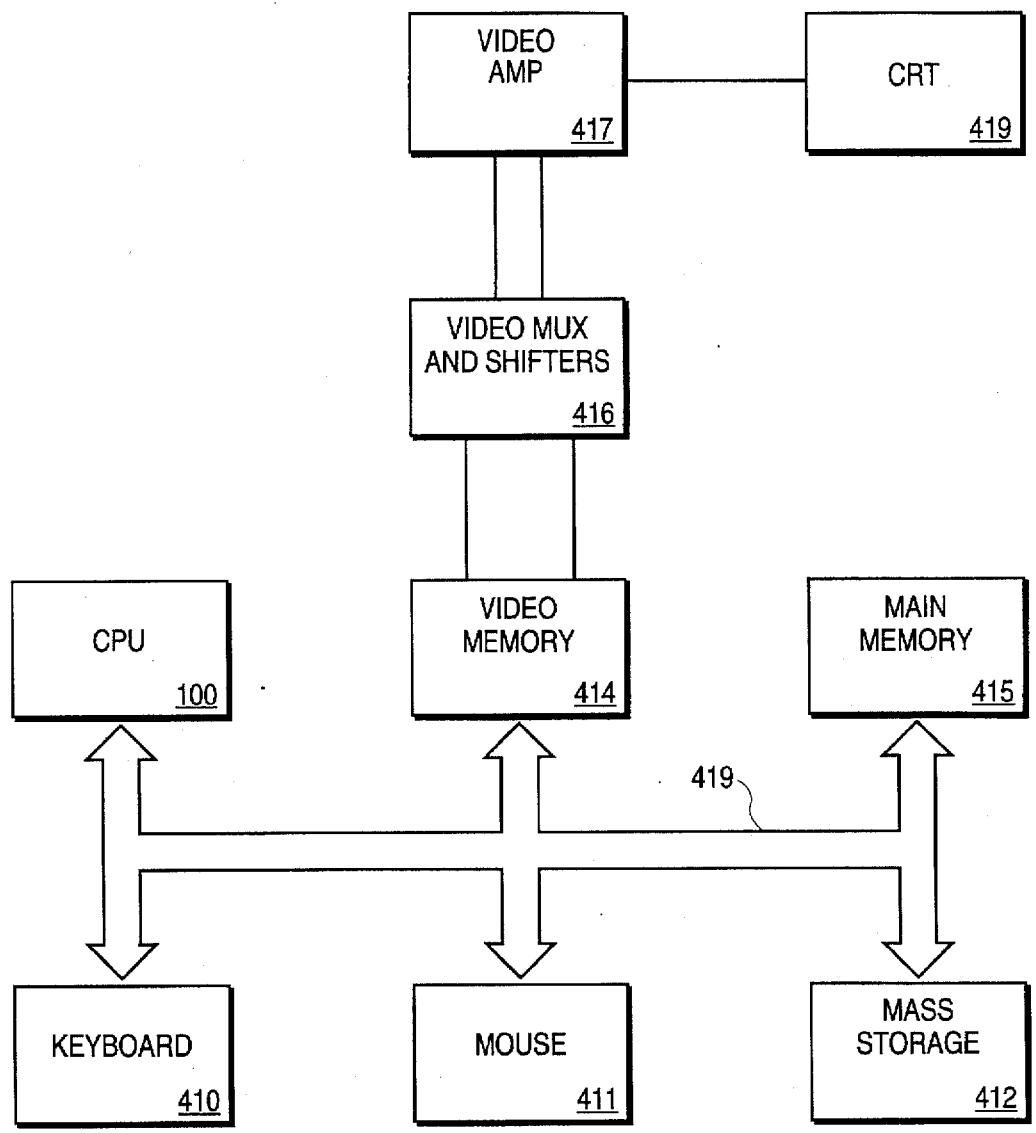
FIG. 4 is a block diagram of an example of a computer system for implementing the present invention.

The present invention may be implemented on any conventional or general purpose computer system. An example of one embodiment of a computer system for implementing this invention is illustrated in FIG. 4. A keyboard 410 and mouse 411 are coupled to a bi-directional system bus 419. The keyboard and mouse are for introducing user input to the computer system and communicating that user input to CPU 413. The computer system of FIG. 4 also includes a video memory 414, main memory 415 and mass storage 412, all coupled to bi-directional system bus 419 along with keyboard 410, mouse 411 and CPU 413. The mass storage 412 may include both fixed and removable media, such as magnetic, optical or magnetic optical storage systems or any other available mass storage technology. The mass storage may be shared on a network, or it may be dedicated mass storage. Bus 419 may contain, for example, 32 address lines for addressing video memory 414 or main memory 415. The system bus 419 also includes, for example, a 32-bit data bus for transferring data between and among the components, such as CPU 413, main memory 415, video memory 414 and mass storage 412. Alternatively, multiplex data/address lines may be used instead of separate data and address lines.

In the preferred embodiment of this invention, the CPU 413 is a 32-bit microprocessor manufactured by Motorola, such as the 68030 or 68040, or Intel, such as the 80386 or 80486. However, any other suitable microprocessor or microcomputer may be utilized.

Main memory 415 is comprised of dynamic random access memory (DRAM) and in the preferred embodiment of this invention, comprises 8 megabytes of memory. More or less memory may be used without departing from the scope of this invention. Video memory 414 is a dual-ported video random access memory, and this invention consists, for example, of 256 kbytes of memory. However, more or less video memory may be provided as well.

One port of the video memory 414 is coupled to video multiplexer and shifter 416, which in turn is coupled to video amplifier 417. The video amplifier 417 is used to drive the cathode ray tube (CRT) raster monitor 418. Video multiplexing shifter circuitry 416 and video amplifier 417 are well known in the art and may be implemented by any suitable means. This circuitry converts pixel data stored in video memory 414 to a raster signal suitable for use by monitor 418. Monitor 418 is a type of monitor suitable for displaying graphic images, and in the preferred embodiment of this invention, has a resolution of approximately 1020× 832. Other resolution monitors may be utilized in this invention.

The computer system described above is for purposes of example only. The present invention may be implemented in any type of computer system or programming or processing environment.

Figure 1:
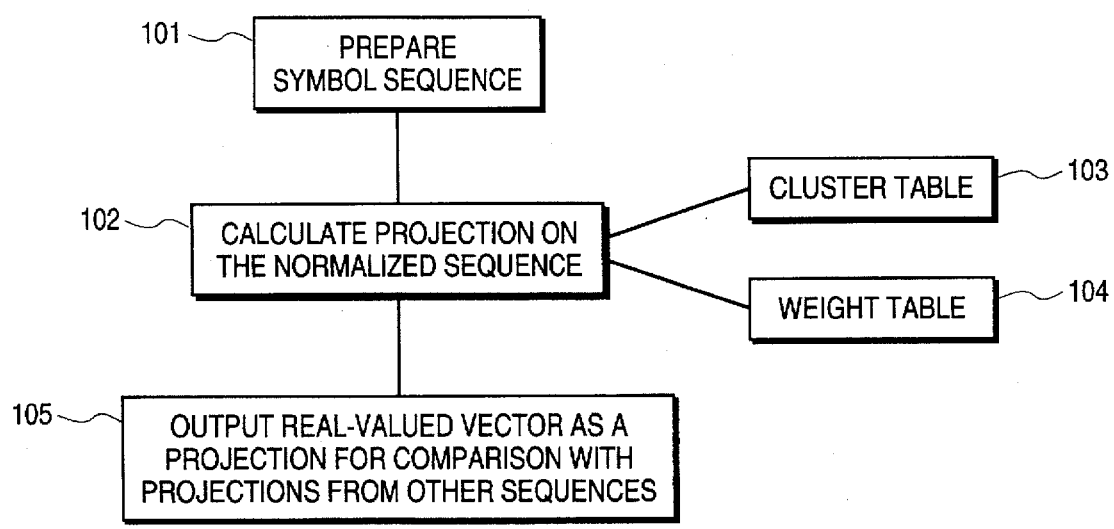
FIG. 1 is a flow diagram of the operation of the present invention.

A flow diagram illustrating the operation of the present invention is illustrated in FIG. 1. At step 101, the symbol sequence to be compared is identified and prepared. This involves normalizing the sequence. At step 102, a projection of the normalized sequence is generated. The projection can be generated with one or both of cluster table 103 and weight table 104.

At step 105, the output of step 102, a real valued vector projection, is compared to other vector projections in a projection matching step.

NORMALIZATION

A string of S symbols is stretched or compressed into a normalized image of N symbols. The size of each symbol in the normalized image represents its portion in the string. Suppose the string of symbols is the word "lists", consisting of five letters or symbols (|S|=5) as shown below:

| l | i | s | t | s |
|---|---|---|---|---|

Consider the case where the normalized number of symbols is eight so that N=8. The medium of a symbol, M, in normalized image is computed as follows:

$$M(S_i) = i * |N|/|S|$$

where $S_i$ is the i-th symbol in string S, |N| is the normalized size, and |S| is the length of string S. The five symbols of the word list are now stretched into eight symbols, with the medium of each symbol being 1.6i, ((N/S)=(8/5)=1.6). The normalized size of each symbol is therefor 1.6 normal symbol slots.

Each symbol in the normalized string must have a unitary value. Therefor "l" is placed in the first symbol slot, leaving 0.6l to be placed in the second symbol slot, as shown below. To provide a unitary value for the second symbol slot, 0.4i is added to 0.6l. This leaves 1.2i. 1.0i or "i" is placed in the third symbol slot, leaving 0.2i for the fourth symbol slot and so on as shown below. In summary, each symbol from the original string is represented by 1.6 times that symbol in the normalized string.

| 1 | 0.6l + 0.4i | i | 0.2i + 0.8s | 0.8s + 0.2t | t | 0.4t + 0.6s | S |

SYMBOL PROJECTION

A projection is a real-valued vector that is equally divided into as many partitions as members in a symbol set. For example, the symbol set for a spelling checker is the set of symbols of the alphabet, numeric characters, and punctuation marks. Each partition is called a "closure" $C_i$ for its corresponding symbol i.

Each symbol in the image is projected onto its closure in normal distribution, with the maximum value of the distribution at the midpoint of the distribution. A decreasing series D with length |D| can be defined to simulate the normal distribution. D is called distributing series, and |D| distribution size. The projection is computed as follows:

$$C_{s_iM(Si)+|D|+j}=d_j$$

$$C_{s_iM(Si)+|D|-j}=d_j \ (j=0,1,2,\ldots,|D|-1)$$

Where the first equation (+j) calculates the right side from the medium and the second equation (−j) calculates the left side
where $d_j$ is j-th item in distribution series D, and $C_{ik}$ is the k-th item in symbol $S_i$'s closure. Please note that "k" is equal to $M(Si)+|D|+j$ in the +j equation and equal to $M(Si)+|D|-j$ in the −j equation. If a symbol occurs more than once and its distribution overlaps, only the larger values are kept.

For example, with distribution series (4, 3, 1) whose length |D| is 3, the closures for symbols L, I, S and T have a size of 12 (|N|+(2*|D|)−2=(8+(2*3)−2)=12) and are as follows:

"L" | 1 | 3 | 4 | 3 | 1 |   |   |   |   |   |   |   |

"I" |   |   | 1 | 3 | 4 | 3 | 1 |   |   |   |   |   |

"S" |   |   |   |   |   | 1 | 3 | 4 | 3 | 4 | 3 | 1 |

"T" |   |   |   |   |   | 1 | 3 | 4 | 3 | 1 |   |   |

Note that because there are two instances of the letter "s" in the sequence, there are two peaks. Each peak corresponds to an occurrence of "s" in the normalized stream.

The preferred embodiment of the present invention utilizes one of the following two distribution tables:

distribution table #1: {21,19,17,14,10,4,};

distribution table #2: {17,14,10,4,};

The preferred embodiment of the present invention uses the following encoding and decoding tables.

The first column of the encoding table contains mapping values and the second column contains ASCII code values. The first column of the decoding table contains alpha characters and the second column contains mapping values.

Encoding Table: {

| 31, 31, 31, 31, 31, 31, 31, 31, | /* 0–7 */ |
| 31, 31, 31, 31, 31, 31, 31, 31, | /* 8–15 */ |
| 31, 31, 31, 31, 31, 31, 31, 31, | /* 16–23 */ |
| 31, 31, 31, 31, 31, 31, 31, 31, | /* 24–31 */ |
| 31, 31, 31, 31, 31, 31, 31, 26, | /* 32–39 */ |
| 31, 31, 31, 31, 31, 27, 28, 31, | /* 40–47 */ |
| 31, 31, 31, 31, 31, 31, 31, 31, | /* 48–55 */ |
| 31, 31, 31, 31, 31, 31, 31, 31, | /* 56–63 */ |
| 31, 0, 1, 2, 3, 4, 5, 6, | /* 64–71 */ |
| 7, 8, 9, 10, 11, 12, 13, 14, | /* 72–79 */ |
| 15, 16, 17, 18, 19, 20, 21, 22, | /* 80–87 */ |
| 23, 24, 25, 31, 31, 31, 31, 31, | /* 88–95 */ |
| 31, 0, 1, 2, 3, 4, 5, 6, | /* 96–103 */ |
| 7, 8, 9, 10, 11, 12, 13, 14, | /* 104–111 */ |
| 15, 16, 17, 18, 19, 20, 21, 22, | /* 112–119 */ |
| 23, 24, 25, 31, 31, 31, 31, 31 | /* 120–127 */ |
| 31,31,31,31,31,31,31,31,31,31,31,31,31,31,31,31, | /* 128–143 */ |
| 31,31,31,31,31,31,31,31,31,31,31,31,31,31,31,31 | /* 144–159 */ |
| 31,31,31,31,31,31,31,31,31,31,31,31,31,31,31,31, | /* 160–175 */ |
| 31,31,31,31,31,31,31,31,31,31,31,31,31,31,31,31, | /* 176–191 */ |
| 31,31,31,31,31,31,31,31,31,31,31,31,31,31,31,31, | /* 192–207 */ |
| 31,31,31,31,31,31,31,31,31,31,31,31,31,31,31,31, | /* 208–223 */ |
| 31,31,31,31,31,31,31,31,31,31,31,31,31,31,31,31, | /* 224–239 */ |
| 31,31,31,31,31,31,31,31,31,31,31,31,31,31,31,31, | /* 240–255 */ |

};

Decoding Table: {

| 'a', 'b', 'c', 'd', 'e', 'f', 'g', 'h', | /* 0–7 */ |
| 'i', 'j', 'k', 'l', 'm', 'n', 'o', 'p', | /* 8–15 */ |
| 'q', 'r', 's', 't', 'u', 'v', 'w', 'x', | /* 16–23 */ |
| 'y', 'z', '\'', '–', '.', 255, 255, 255 | /* 24–31 */ |

};

PROJECTION WITH CLUSTERS

A cluster is a subset of the character set which contains a core character and any number of neighbor characters. Each character of the character set is a core character of a cluster. Each core character of a cluster has one or more neighbor characters. A cluster is used to represent relationships among characters. For example, the following cluster:

{{MAP('a'), 8}, {MAP('s'), 2}, {MAP('e'), 1}, {0, 0}} indicates that 's' and 'e' are dose to 'a' and 's' is closer to 'a' than 'e' is. The present invention uses an array of clusters, each cluster corresponds to a character in the character set as the core. That is, each character in the character set is the core character of its own cluster. Note that MAP( ) used above is to indicate that ASCII is usually not used for the comparison scheme of the present invention, and ASCII characters are mapped into a smaller set. The mapping function is used to reduce the size of the character set for memory optimization. The memory space for the full ASCII set may not be available. In addition, the actual symbols of interest, such as in a spelling checker, may be fewer than in the entire ASCII set. Therefore, the characters can be mapped into a smaller set. In one embodiment, characters are mapped into a space from 0 to 32.

A cluster $U_i$ defines weights for neighbors of the core symbol or character i; $u_{ii}$ is the weight of i itself. Every symbol or character is the core of its cluster. In simple projection, a cluster has a core character as its only symbol, and the weight for the core is 1.

When a cluster has more than one symbol, i.e. a core character and one or more neighbor characters, the core symbol or character is not only projected to its own closure but also its neighbors' closures. The projection becomes:

$$C_{S_jM(Si)+|D|+j}=d_j*u_{Sin}$$

$$C_{S_jM(Si)+|D|-j}=d_j*u_{Sin} \quad (j=0,1,2,\ldots,|D|-1)$$

where n is a member of the cluster of S.

Clusters are used to associate otherwise discrete symbols. The use of clusters can provide a means to tailor queries to provide desired results. For example, consider the word "communicate" and two misspellings of that word, namely "communikate" and "communigate". It may be desirable to implement the present invention so that "communikate" shows a higher degree of matching than "communigate" (because the "k" sound is more like the hard "c" sound of "communicate"). By including "k" in the cluster of "c", the present invention can show that "communikate" is more likely to be "communicate" than is "communigate".

The present invention implements clusters through cluster tables. An example of a cluster table for the 26 lower case alpha characters is illustrated below. Referring to the cluster table, each row is a cluster, with the core character being identified in the leftmost column. The core character is followed by a series of pairs of values where the first value is the numeric representation of the character and the second value in the pair is the weight assigned to the character. The first value of each pair represents the numerical designation ("0" for "a", "1" for "b", "2" for "c", etc,) of a character in the cluster of the core character. The second number in each paired value represents the weight to be given the cluster character as a substitute for the core letter.

The first pair is the core character itself and the value to be given when it is a match. The remaining pairs each represent a neighbor character and its assigned weight. For example, for the numeric representation "a", the first pair "[0, 8] represents letter "0" (i.e. "a") and its match weight of 8. A review of the table reveals that all core character have a weight of "8". In this example, a value of 8 is given for an exact match. Continuing with the cluster for the core character "a", the next pair is for the neighbor character "e", and its match weight of 4. the next two neighbor character, "o" (letter 14), and "s" (letter 18), have match weights of 2. The fourth neighbor character, "i", has a match weight of 4. For the letter "a", the letters "e" and "i" are more often by mistake than the letters "o" and "s".

The cluster table values associated with each core character represent letters that may have the same sound as a letter (i.e. "k" and hard "c", "s" and "c") or that are near to each other on a standard "qwerty" keyboard, and are therefore likely to be a mis-stroke. The following cluster table is given by way of example only. Other cluster tables may be used without departing from the scope or spirit of the present invention.

| | cluster table: { |
|---|---|
| a: | {{0,8}, {4,4}, {14,2}, {18,2}, {8,4}, {0,0}}, |
| b: | {{1,8}, {21,2}, {13,2}, {3,2}, {0,0}}, |
| c: | {{2,8}, {18,4}, {10,4}, {23,2}, {21,2}, {25,2}, {0,0}}, |
| d: | {{3,8}, {18,2}, {5,2}, {1,2}, {0,0}}, |
| e: | {{4,6}, {0,3}, {8,3}, {14,2}, {22,2}, {17,2}, {20,2}, {0,0}}, |
| f: | {{5,8}, {21,4}, {6,2}, {3,2}, {15,4}, {7,4}, {0,0}}, |
| g: | {{6,8}, {9,4}, {5,2}, {7,2}, {0,0}}, |
| h: | {{7,8}, {5,4}, {6,2}, {9,2}, {0,0}}, |
| i: | {{8,8}, {24,4}, {4,3}, {14,2}, {20,2}, {0,4}, {0,0}}, |
| j: | {{9,8}, {6,4}, {10,2}, {7,2}, {0,0}}, |
| k: | {{10,8}, {2,4}, {23,4}, {16,4}, {9,2}, {11,2}, {0,0}}, |
| l: | {{11,8}, {17,2}, {10,2}, {0,0}}, |
| m: | {{12,8}, {13,4}, {0,0}}, |
| n: | {{13,8}, {12,2}, {1,2}, {0,0}}, |
| o: | {{14,8}, {20,2}, {4,3}, {0,2}, {8,3}, {15,2}, {0,0}}, |

| | cluster table: { |
|---|---|
| p: | {{15,8}, {5,4}, {14,2}, {0,0}}, |
| q: | {{16,8}, {10,4}, {22,2}, {0,0}}, |
| r: | {{17,8}, {11,2}, {4,2}, {19,2}, {0,0}}, |
| s: | {{18,8}, {2,4}, {25,4}, {23,4}, {0,2}, {3,2}, {0,0}}, |
| t: | {{19,8}, {17,2}, {24,2}, {0,0}}, |
| u: | {{20,8}, {14,2}, {8,2}, {4,2}, {22,4}, {0,0}}, |
| v: | {{21,8}, {22,4}, {5,4}, {1,2}, {2,2}, {0,0}}, |
| w: | {{22,8}, {21,4}, {16,2}, {4,2}, {20,4}, {0,0}}, |
| x: | {{23,8}, {10,4}, {18,4}, {25,2}, {2,2}, {0,0}}, |
| y: | {{24,8}, {20,2}, {19,2}, {8,4}, {0,0}}, |
| z: | {{25,8}, {18,4}, {23,2}, {2,2}, {0,0}}, |
| | (other character's cluster) |
| | {{26,8}, {0,0}}, |
| | {{27,8}, {0,0}}, |
| | {{28,8}, {0,0}}, |
| | {{29,8}, {0,0}}, |
| | {{30,8}, {0,0}}, |
| | {{31,8}, {0,0}} |

The use of a cluster table is optional in the present invention.

PROJECTION WITH POSITION WEIGHTS

In addition to, or instead of, the use of weights in clusters, weights, w, can be assigned to each position in the normalized images. When a symbol is projected in the image, the distribution value and cluster weight can be multiplied with the weight associated with the symbol's position. Note that the weights are assigned to the normalized image instead of the original string.

It is often the case that words are misspelled at the beginning rather than in the middle or end. The position table can be used to indicate that the first two positions of a word have twice the weight compared with others. Thus, the first two characters in the string will have more significant impact on the similarity comparison. So, if the beginnings of two words are the same, they are more likely to be the same word.

The values of position weights are chosen to reflect the impact that the position has on the similarity comparison. Position weight is treated as a variable, not a constant, and its value can be selected to achieve the goal of representing the relative importance the position of a symbol or character has on a character or symbol string.

When using position weights with cluster tables, the projection becomes:

$$C_{S_jM(Si)+|D|+j}=d_j*W_{M(Si)}*u_{Sin}$$

$$C_{S_jM(Si)+|D|-j}=d_j*W_{M(Si)}*u_{Sin} \quad (j=0,1,2,\ldots,|D|-1)$$

When using position weights without clusters, the projection becomes:

$$C_{S_jM(Si)+|D|+j}=d_j*W_{M(Si)}$$

$$C_{S_jM(Si)+|D|-j}=d_j*W_{M(Si)} \quad (j=0,1,2,\ldots,|D|-1)$$

The following code may be used to generate projections from a given symbol string:

```
* NAME
*      zfmprojs - Projection Matching: generate projections
* DESCRIPTION
*      generate projections from the string given and touch
*      characters reached
*/
static eword
zfmprojs(pe__p, str, slen, projs)
```

```
reg0  zfmpenv  *pe_p;
text           *str;
eword          slen;
ub2            *projs;
{
    reg6  eword      pp;        /* count the positions in projection */
    reg1  ub2        *prjptrl;  /* pointers to go thru a proj */
    reg7  ub2        *prjptrr;
    reg3  ub2        *dptr;     /* pointer to go thru dist[ ] */
    reg2  eword      ss;        /* score for a position */
    reg8  zfmpclup   clstptr;   /* pointer to go thru a cluster */
    reg3  text       ch;        /* a char in the cluster */
    reg9  text       core;      /* core char */
    reg14 eword      score;     /* score for the char */
    reg10 eword      cc;        /* *count the chars in string */
    reg11 eword      sum;       /* total score */
          eword      x0;        /* beginning of a distribution */
    /* following variables are copied from zfmpenv */
    reg13 eword      size;      /* size of the char set */
    reg15 eword      neighbors; /* neighbors */
    reg12 ub2        *dist;     /* distribution */
          eword      closure;   /* size of the projection */
          eword      npos;      /* number of positions */
          ub2        *poswts;   /* pointed to the weight table */
    /* get info from the ZFMP structure */
    size      = pe_p->pe_size;
    neighbors = pe_p->pe_neighbors;
    closure   = pe_p->pe_closure;
    npos      = pe_p->pe_npos;
    dist      = pe_p->pe_dist;
    poswts    = pe_p->pe_poswts;
    /* initialize work areas */
    for (prjptrl = projs, pp = size * closure; pp; --pp, ++prjptrl)
    {
        *prjptrl = (ub2)0;
    }
    sum = (eword)0;   /* sum is accumulated */
    /* for each char (as a core) in the string */
    for (cc = (eword)1, ++slen; cc < slen; ++cc, ++str)
    {
        core = *str;
        /* check the range of the core */
        if (core >= size)
        {
            continue;
        }
        /* locate the char in our projection */
        if ((!cc) || (slen == 1))
        {
            x0 = (eword)0; /* so that divived-by-0 won't happen */
        }
        else
        {
            x0 = cc * npos / slen;
        }
        /* get a cluster, for each char in the cluster, do ... */
        for (clstptr = (zfmpclup)pe_p->pe_clusters[core];
             clstptr->cl_sc;
             ++clstptr)
        {
            ch = clstptr->cl_ch;
            /* get the score and mutiply the weigth */
            score = (eword)clstptr->cl_sc * poswts[x0];
            /* The char is touched. First compute the
               points at the peak, than set prjptrl and
               prjptrr at the left and the right of
               the peak, respectively. */
            prjptrl = projs + ch * closure + x0 + neighbors;
            sum += *prjptrl = (ub2) (score * dist[0]);
            prjptrr = (prjptrl--) + 1;
            /* Prjptrl and prjptrr are moving toward left
               and right, away from the peak. The position
               they point to have the same score, so that
               ss is only calculated once. */
            for (pp = neighbors, dptr = dist + 1;
                 pp;
                 --pp, --prjptrl, ++prjptrr, ++dptr)
            {
                ss = score * (*dptr); /* compute a score */
                /* I am not sure whether to accumulate
                   points or to keep the highest one */
#ifndef ZFMPACCUMULATE
                if (ss > *prjptrl)
                {
                    sum += ss - *prjptrl;
                    *prjptrl = (ub2)ss;
                }
                if (ss > *prjptrr)
                {
                    sum += ss - *prjptrr;
                    *prjptrr = (ub2)ss;
                }
else
                sum += ss + ss;
                *prjptrl += (ub2)ss;
                *prjptrr += (ub2)ss;
#endif
            }
        }
    }
    return (sum);
}
```

PROJECTION MATCHING

After a projection is generated, whether it be a simple projection, a projection with clusters, a projection with position weights, or a projection with both clusters and position weights, a comparison of the model projection and the query projection is made to determine the closeness of the match. The comparison is accomplished using a similarity function.

A projection is a series of closures concatenated together. The similarity function $\Theta$ of the preferred embodiment of the present invention is defined as follows:

$$\Theta(P_1, P_2) = 1 - \frac{\Sigma |p_{1i} - p_{2i}|}{\Sigma p_{1i} + \Sigma p_{2i}}$$

where $P_1$ and $P_2$ are two projections to be compared. When two projections are identical, or two original strings are identical, the similarity is 1. The lowest possible $\Theta$ is 0.

Figure 2:
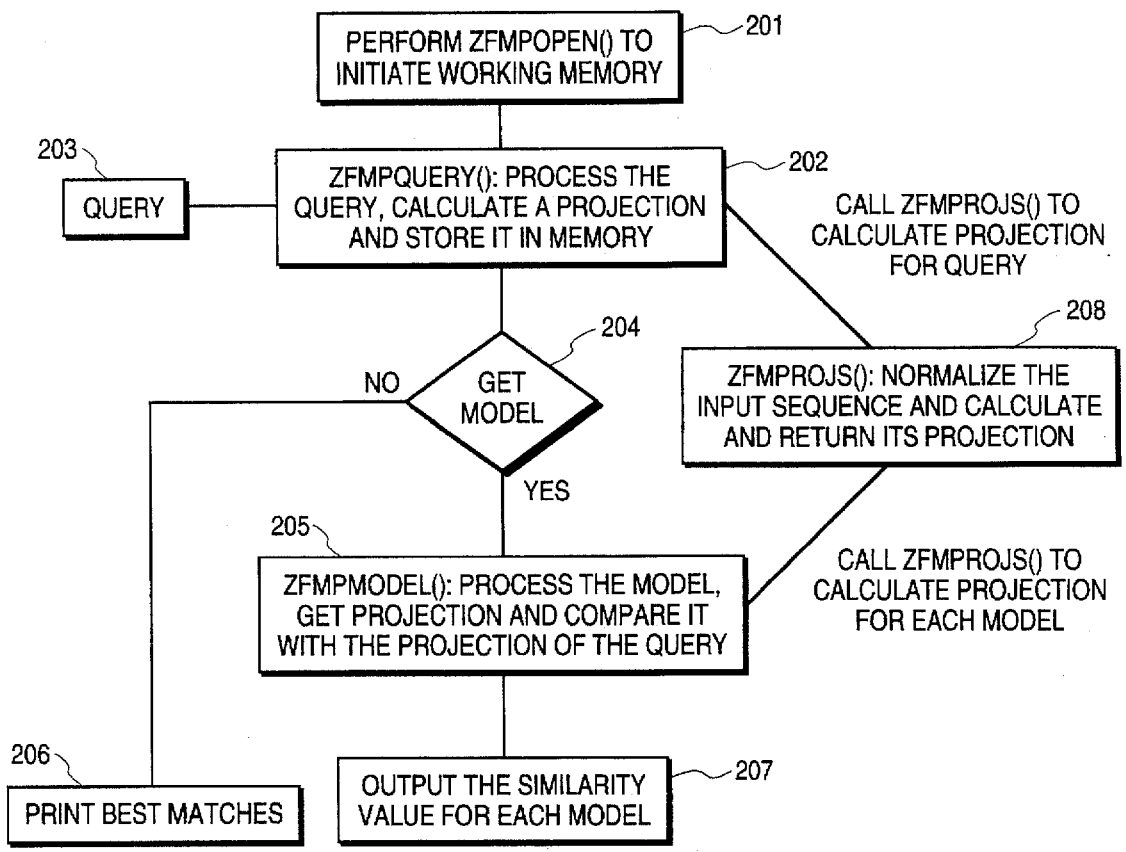
FIG. 2 is a flow diagram illustrating the preferred embodiment of the present invention.

FIG. 2 is a flow diagram illustrating the preferred embodiment of the present invention. At step 201, do zfmpopen( ) is performed. zfmpopen opens an environment in which other functions operate. It returns a handle to the open environment and this handle is kept and passed to other functions to refer to the same environment. poswts and dist are two 0-terminated integer arrays. They are used to adjust the behavior of the comparison mechanism. For example, the following setting:

int poswts[ ]={2, 2, 2, 2, 2, 2, 1, 1, 1, 1, 1, 1, 1, 1, 1, 0};

int disit[ ]={21, 20, 18, 15, 10, 6, 4, 2, 0};

gives more priority on the beginning of a string and compensates models that have their characters matched to nearby positions in the query. Usually poswts is longer than most of expected strings. The longer dist the more compensation is give on matched characters at different positions. But dist is not longer than poswts in the preferred embodiment of the present invention. An extreme case is:

int poswts[ ]={1, 1, 1, 1, 1, 1, 1, 1, 1, 1, 0};

int dist[ ]={1, 1, 1, 1, 1, 1, 1, 1, 1, 1, 0};

which sets the string matching to a letter frequency comparison. The parameter clusters is an array of clusters, each cluster corresponds to a character in the character set as the core. Code for implementing zfmpopen( ) is illustrated in Appendix A.

At step 202, zfmpquery( ) is executed on a query 203. The query is processed, a projection is calculated by calling zfmpprojs( ) at step 208, and the result is stored in memory. zfmpquery( ) sets a new query for an environment. Once a query is set, all comparisons made in the environment are based on this query. pe__h indicates the environment, query is the query string, and qlen is the length of query. Code for implementing zfmpquery( ) is illustrated in Appendix B.

At decision block 204, the argument "Get model?" is made. If the argument is true, the system proceeds to step 205. If the argument is false, their are no more models, and the system proceeds t6 step 206, where the best matches are displayed.

At step 205, zfmpmodel( ) is executed. A model is processed by calling zfmpprojs( ) at step 208. A projection is returned and compared to the projection of the query. Code for implementing zfmpmodel is illustrated in Appendix C. At step 207, the similarity value for each model as compared to the query is provided.

At step 208, zfmprojs( ) is used to normalize the input sequence and calculate and return its projection. zfmprojs( ) may use cluster tables and/or position weights as desired.

PROJECTION GENERATION AND CODE LISTING

Figure 5A:
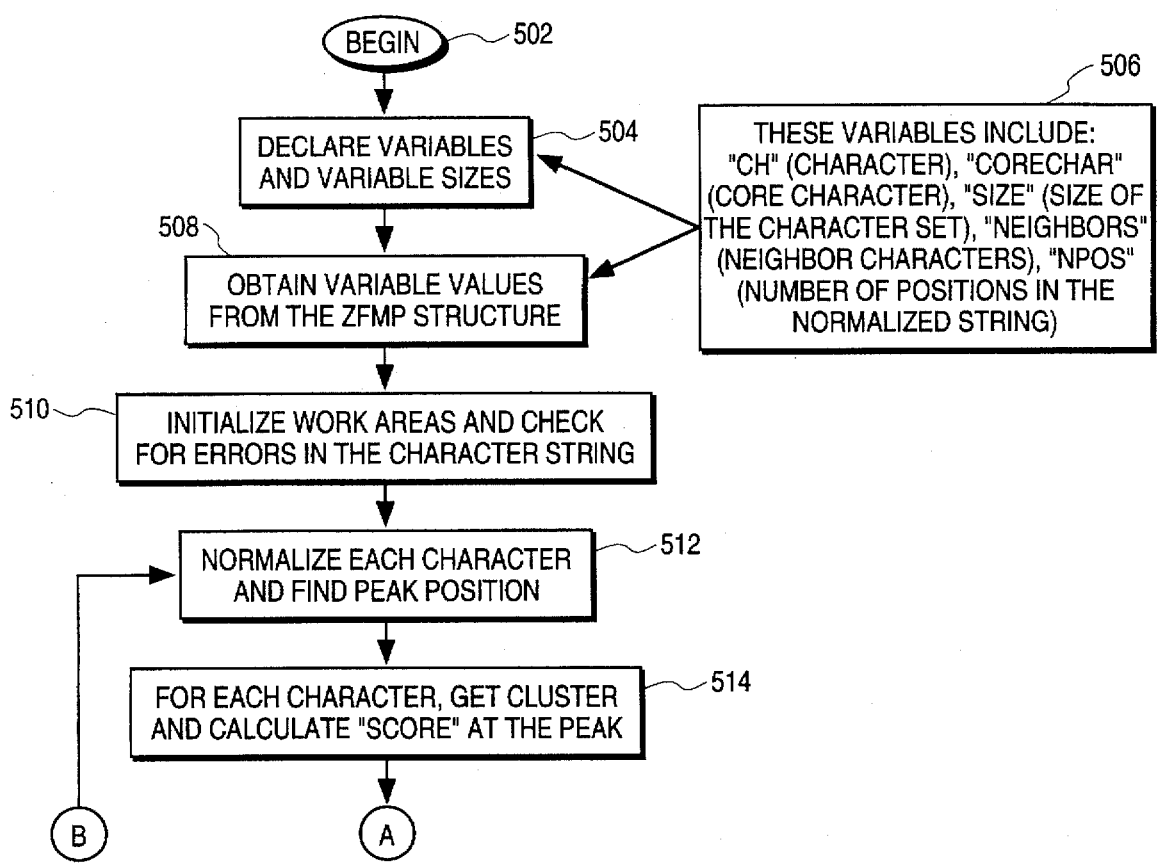
FIGS. 5A and 5B illustrate a flow diagram for generating projections from a character string.
Figure 5B:
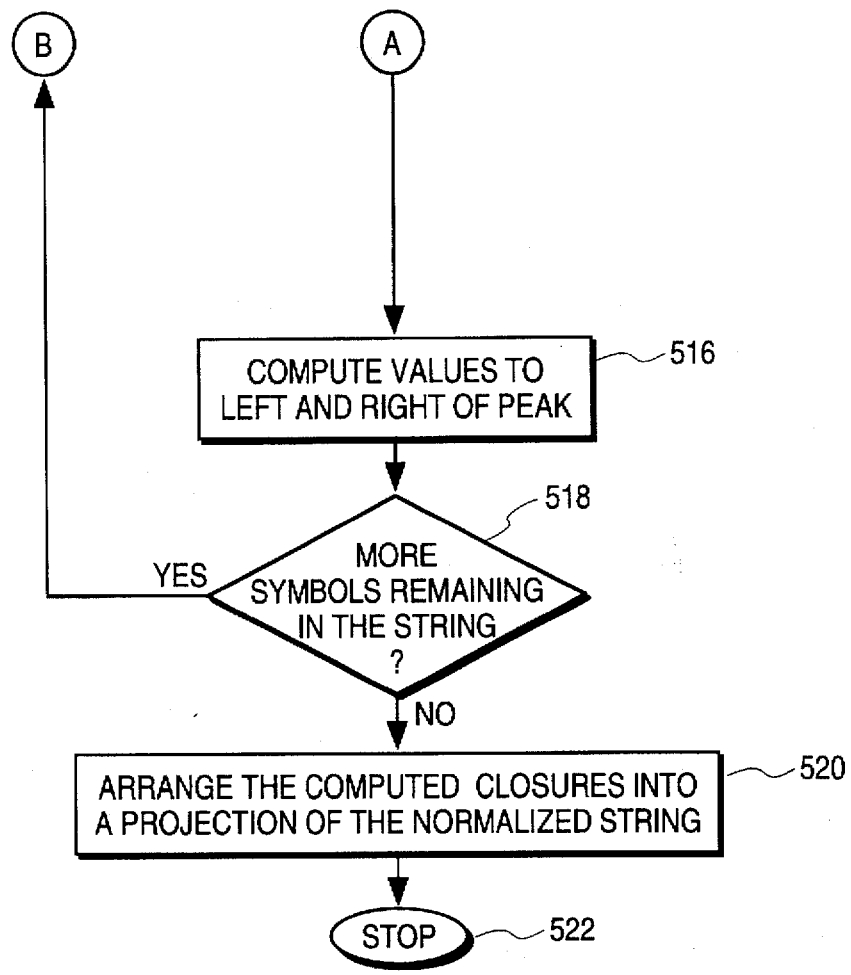

FIGS. 5A–5B are flow diagrams that illustrate the invention's method for generating projections from a character string according to the computer code shown on pages 16–18 of the present application. The method begins at step 502. At step 504 variables are declared and an appropriate size is designated for each variable. These variables include (but are not limited to) "ch" for a character in the character string for which a projection is being performed; "core char" for a core character in a cluster of characters; "size" is the size of the character set, for example, the number of characters in the character set, e.g. 26 characters for the set of lower case alpha characters. (It is noted that a character string may use only a portion, and not all, of the character set). The variable "neighbors" stands for the characters neighboring a core character in a cluster of characters. The variable "npos" stands for the number of positions in the normalized string (for example, the number of slots shown in the normalized string on page 10). At step 508 variable values are obtained by opening a common structure (referred to as a "ZFMP" structure). Some of the variables referred to in steps 504 and 508 are set forth in box 506.

At step 510, memory is allocated (work areas initialized) to perform the operations of flow charts 5A–5B. Also at step 510, the method of the invention checks for any errors in the character string. At step 512, each character in the character string is normalized according to the procedure described above. This is illustrated by the code equation "x0=cc*npos/slen; where x0 is the medium, cc is the character count, npos is the length of the normalized string, and slen is the length of the character string being normalized. In addition, the peak position of the character in the closure is determined. For example, if the character is the first character in the string, then the peak is at the beginning of the closure for that character. This is illustrated in the above example for the word "list". The peak for the character "L" is at the first "non-tail" position in the closure for "L". The tail is so that the distribution values can be placed in the closure.

At step 514, for each character, the cluster for that character is obtained and a "score" value is generated for the core character and each neighbor character in the cluster. Fore example, if the character from the string is "a", a score value is generated for the closure for "a" as the core character, as well as for the closures for "o", "e", "s", and "i" respectively. The score value is generated pursuant to the code equation:

score=(eword)clstptr→cl_sc*poswts[x0];

As can be seen, this equation includes any position weight that may be assigned to the position in the string. At step 516 the values to the left and the right of the peak value are calculated. As described above, when a symbol is projected on the closure of a character in the character set, there is a distribution series so that values to the left and right of the peak value are calculated using the distribution series. The closure can be thought of as having a number of positions N with a "tail" on either side of length (D–1). When D=3 and N=8, for example, each character in the character set has a closure of length 8 with a two additional spaces at the beginning and two at the end for a total of 12.

At decision block 518 the argument "More symbols remaining in the normalized string?" is made. If the argument is true, the system returns to step 512. If the argument is false, the system proceeds to step 520 and arranges the closures into a projection of the normalized string. That is, the closures that have been generated for the string (all characters in the string and any neighbor characters). These closures constitute the projection for that string. The process ends at step 520.

Figure 6:
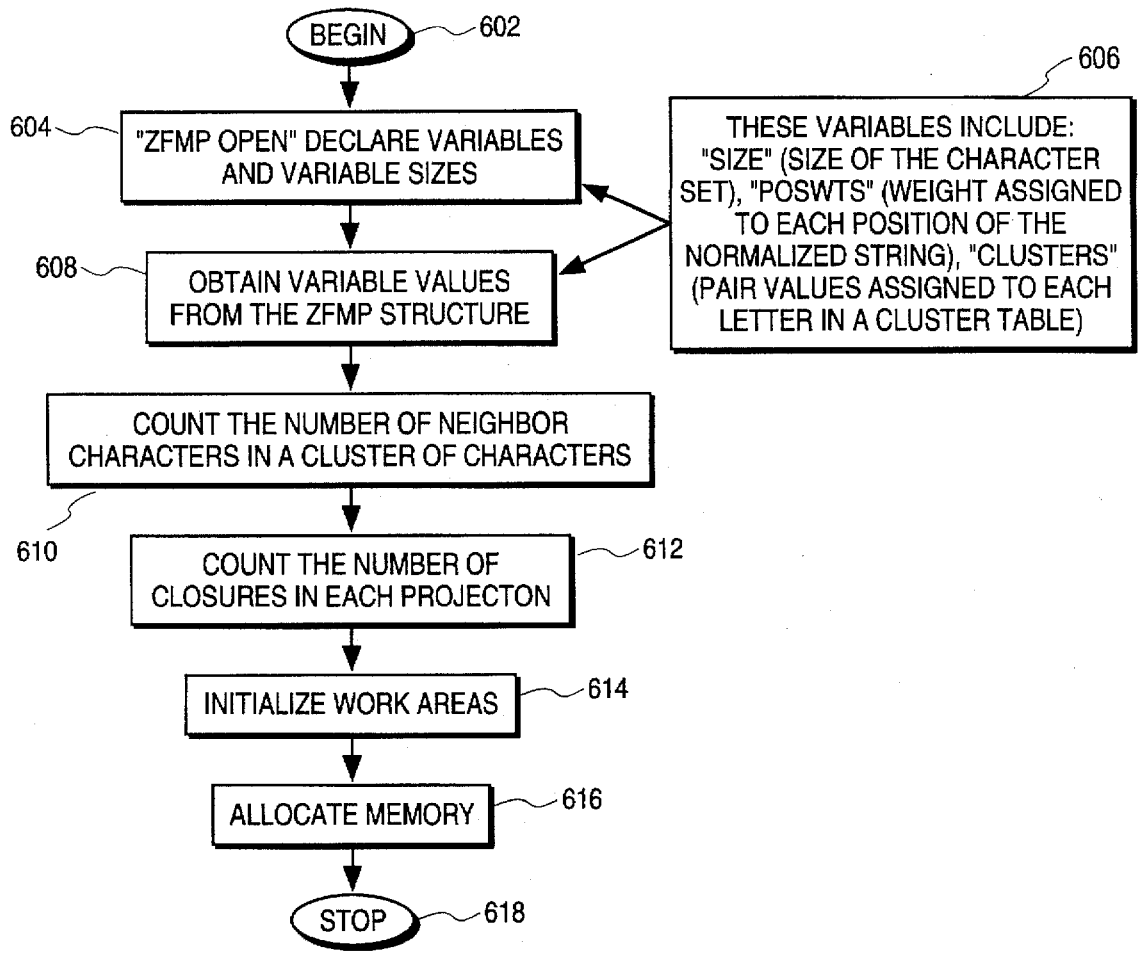
FIG. 6 is a flow diagram of the code of Appendix A.

FIG. 6 shows a flow chart that illustrates the invention's method according to the computer code shown in Appendix A. Operation begins at step 602. At step 604, variables are declared and an appropriate size is designated for each variable, as described in the comment "allocate and initialize zfmpenv structure" in Appendix A. At step 608 variable values are obtained by opening the common ZFMP structure. Some of the variables referred to in steps 604 and 608 are set forth in box 606. These variables include (but are not limited to) "size" which stands for the size of the character set, for example, the number of characters in the character set. "Maxsim", which stands for maximum similarity. This determines the degree of matching to indicate a match when doing projection matching. "Poswts" designates the weight assigned to each position in the normalized string. The variable "dist" is the distribution used in the invention, such as the distributions in distribution table #1 and distribution table #2 described above. The variable "clusters" designates the pair values assigned to each letter in a cluster table. Examples of these pair values are shown in the cluster table of page 14 in the specification.

At step 610 the number of neighbors in a cluster of characters is counted. (for (i=0; disti[i]; ++i);/* [sic] how many neighbors */neighbors=i=1);

At step 612 the normalized size and closure size are counted. (for (i=0; poswts[i]; ++i);/* [sic] how many positions */closure=i+neighbors*2; npos=i;)

At step 614, work areas are initialized as shown below:

```
/* allocate ZFMP environment */
if (!(pe__p = (zfmpenv *)malloc(sizeof(zfmpenv))))
{
    return ((zfmpref *)0);
}
pe__p->pe__size      = size;
pe__p->pe__maxsim    = maxsim;
pe__p->pe__closure   = closure;
pe__p->pe__neighbors = neighbors;
pe__p->pe__npos      = npos;
pe__p->pe__dist      = dist;
pe__p->pe__poswts    = poswts;
pe__p->pe__clusters  = clusters;
pe__p->pe__qprojs    = 0;
pe__p->pe__mprojs    = 0;
```

At step 616, memory is allocated as shown.

```
/* allocate memory */
if (!(pe_p->pe_qprojs = (ub2 *)malloc(sizeof(ub2) * size * closure)) ||
    !(pe_p->pe_mprojs = (ub2 *)malloc(sizeof(ub2) * size * closure)))
{
zfmpclose((zfmpref *)pe_p);
return ((zfmpref *)0);
}
zfmpopen stops at step 620.
```

Figure 7:
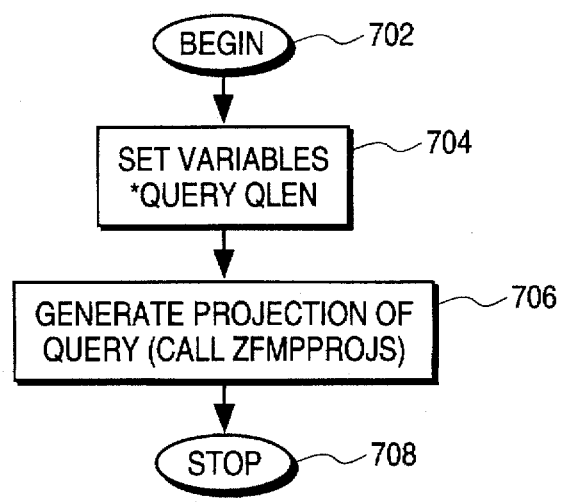
FIG. 7 is a flow diagram of the code of Appendix B.

FIG. 7 is a flow chart that illustrates the routine zfmpquery of step of FIG. 2 according to the computer code shown in Appendix B. This code generates a projection vector for the "query", that is, the string that is to be compared to the projection vectors of the model. This is accomplished by calling the routine "zfmprojs" of FIGS. 5A and 5B. Operation begins at step 702. At step 704, the variables values are set. This includes variables query (text string of the query), and qlen (query length). At step 706, a projection for the query is generated using zfmprojs routine. At step 708, the process ends.

Figure 8:
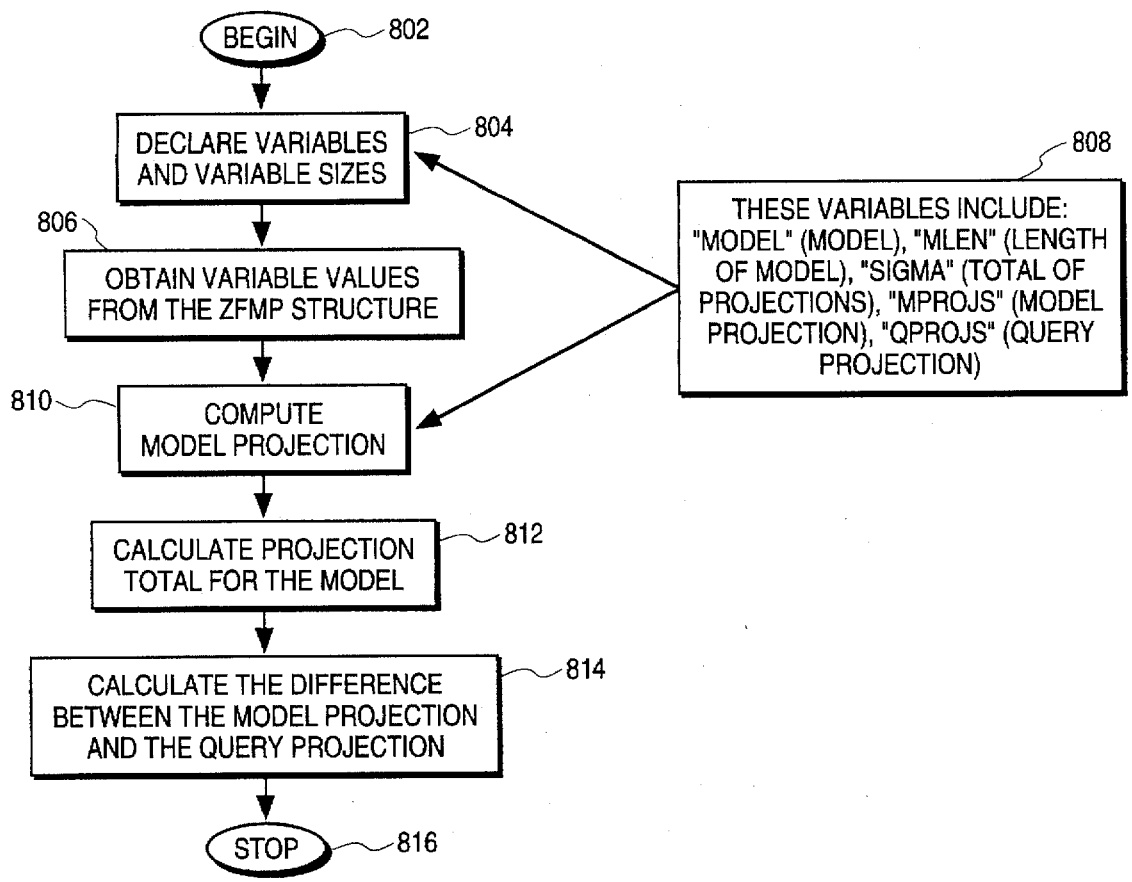
FIG. 8 is a flow diagram of the code of Appendix C.

FIG. 8 is a flow chart that illustrates the invention's method of generating projections for the models and comparing each model's projection to the projection of the query to determine the degree of matching. This corresponds to step 205 of FIG. 2 of the present invention and according to the computer code shown in Appendix C.

Operation begins at step 802. At step 804 variables are declared and an appropriate size is designated for each variable. At step 806 variable values are obtained by opening the common ZFMP structure. Some of the variables referred to in steps 804 and 806 are set forth in box 808. These variables include (but are not limited to) "model" which stands for a model character string for which a projection will be performed. "Mlen" is another one of these variables; it designates the length of the model character string. "Sigma" stands for the total of projections (which is equal to the denominator of the equation on page 19). The variable "mprojs" designates the projection obtained for the model character string. Likewise, the variable "qprojs" denotes the projection obtained for the query character string.

At step 810 projections are obtained for a model string. At step 812, the projection totals for the model are calculated as follows:

```
sigma = (ub4)zfmp_c(pe_h)->pe_qsum +
    zfmprojs(zfmp_c(pe_h), model,
        mlen,
        mprojs);
```

In other words, at step 812 part of the denominator and numerator (the part related to the model projection) of the equation illustrated in the section on projection matching is calculated. The part of the numerator that comes from the query is already calculated. At step 814, the difference between the model projection and the query projection is calculated as below:

```
/* calculate the difference */
delta = (eword)0;
for (i = zfmp_c(pe_h)->pe_size * zfmp_c(pe_h)->pe_closure;
    i;
    --i, ++qprojs, ++mprojs)
{
    delta += *qprojs > *mprojs? (eword)*qprojs - *mprojs:
```

```
    (eword)*mprojs - *qprojs;
}
return ((eword)((sigma - delta) * (zfmp_c(pe_h)->pe_maxsim) /
    sigma));
}
```

This algorithm differs from the equation for $\Theta$ given above in that a constant "maxsim" is used. This is used to ensure that integers will result from the equation, eliminating the need to work with fractions in the processing of the algorithm. The returned Value is then ratioed with the maxsim value to determine the degree of similarity.

As discussed in the specification, no difference between the model projection and the query projection causes the left side of the equation shown in the section on projection matching to be equal to one. On the other hand, the greatest amount of difference (i.e., no similarity between the model and query projections) causes the left side of the equation to be equal to zero. The operation ends at step 816.

EXAMPLE 1

As noted, the present invention can be implemented without using cluster tables or position weight tables. The invention can be implemented using one or both of the cluster table or position weight tables if desired. In this example the query is "communicate" and the model is "communicate" and no cluster table or position weight table is used.

Query: Communicate

Model: Communicate degree(maximum is 17) 16 similarity: 94.117645%:

| query projection(a): | 0 0 0 0 0 0 0 4 10 14 17 14 10 4 0 0 |
|---|---|
| model projection(a): | 0 0 0 0 0 0 0 4 10 14 17 14 10 4 0 0 |
| query projection(c): | 4 10 14 17 14 10 4 10 14 17 14 10 4 0 0 0 |
| model projection(c): | 4 10 14 17 14 10 4 10 14 17 14 10 4 0 0 0 |
| query projection(e): | 0 0 0 0 0 0 0 0 4 10 14 17 14 10 4 |
| model projection(e): | 0 0 0 0 0 0 0 0 4 10 14 17 14 10 4 |
| query projection(i): | 0 0 0 0 0 4 10 14 17 14 10 4 0 0 0 0 |
| model projection(i): | 0 0 0 0 0 4 10 14 17 14 10 4 0 0 0 0 |
| query projection(m): | 0 0 4 10 14 17 17 14 10 4 0 0 0 0 0 0 |
| model projection(m): | 0 0 4 10 14 17 14 10 4 0 0 0 0 0 0 0 |
| query projection(n): | 0 0 0 0 0 4 10 14 17 14 10 4 0 0 0 0 |
| model projection(n): | 0 0 0 0 4 10 14 17 14 10 4 0 0 0 0 0 |
| query projection(o): | 0 4 10 14 17 14 10 4 0 0 0 0 0 0 0 0 |
| model projection(o): | 0 4 10 14 17 14 10 4 0 0 0 0 0 0 0 0 |
| query projection(t): | 0 0 0 0 0 0 0 0 4 10 14 17 14 10 4 0 |
| model projection(t): | 0 0 0 0 0 0 0 0 4 10 14 17 14 10 4 0 |
| query projection(u): | 0 0 0 0 4 10 14 17 14 10 4 0 0 0 0 0 |
| model projection(u): | 0 0 4 10 14 17 14 10 4 0 0 0 0 0 0 0 |

Note that because cluster tables are not used, only the letters of the model (namely, a, c, e, i, m, n, o, t, and u), are used in the comparison. There are two peaks for the letter "c" because it is the first letter and the eighth letter in "communicate". There are two peaks for "m" in the query-"communicate" but only one for the misspelled model "communicate".

EXAMPLE 2

Example two illustrates a situation where a cluster table is used but the position weight table is not used. In this example, distribution table number 2 is used.

query: communicate model: communicate degree(maximum is 136) 131 similarity: 96.323532%:

| | |
|---|---|
| query projection(a): | 0 8 20 28 34 28 40 56 80 112 136 112 51 42 30 12 |
| model projection(a): | 0 8 20 28 34 28 40 56 80 112 136 112 51 42 30 12 |
| query projection(b): | 0 0 0 0 8 20 28 34 28 20 8 0 0 0 0 |
| model projection(b): | 0 0 0 0 8 20 28 34 28 20 8 0 0 0 0 |
| query projection(c): | 32 80 112 136 112 80 32 80 112 136 112 80 32 0 0 0 |
| model projection(c): | 32 80 112 136 112 80 32 80 112 136 112 80 32 0 0 0 |
| query projection(e): | 0 12 30 42 51 42 30 42 51 56 68 84 102 84 60 24 |
| model projection(e): | 0 12 30 42 51 42 34 42 51 56 68 84 102 84 60 24 |
| query projection(i): | 0 12 30 42 51 42 80 112 136 112 68 56 51 42 30 12 |
| model projection(i): | 0 12 30 42 51 42 80 112 136 112 68 56 51 42 30 12 |
| query projection(k): | 16 40 56 68 56 40 16 40 56 68 56 40 16 0 0 0 |
| model projection(k): | 16 40 56 68 56 40 16 40 56 68 56 40 16 0 0 0 |
| query projection(m): | 0 0 32 80 112 136 136 112 34 32 20 8 0 0 0 0 |
| model projection(m): | 0 0 32 80 112 136 112 34 32 20 8 0 0 0 0 |
| query projection(n): | 0 0 16 40 56 68 80 112 136 112 80 32 0 0 0 0 |
| model projection(n): | 0 0 16 40 56 80 112 136 112 80 32 0 0 0 0 |
| query projection(o): | 0 32 80 112 136 112 80 34 34 28 34 28 34 28 20 8 |
| model projection(o): | 0 32 80 112 136 112 34 32 34 28 34 28 34 28 20 8 |
| query projection(p): | 0 8 20 28 34 28 20 8 0 0 0 0 0 0 0 |
| model projection(p): | 0 8 20 28 34 28 20 8 0 0 0 0 0 0 0 |
| query projection(r): | 0 0 0 0 0 0 0 8 20 28 34 34 28 20 8 |
| model projection(r): | 0 0 0 0 0 0 0 8 20 28 34 34 28 20 8 |
| query projection(s): | 16 40 56 68 56 40 16 40 56 68 34 40 20 8 0 0 |
| model projection(s): | 16 40 56 68 56 40 16 40 56 68 34 40 20 8 0 0 |
| query projection(t): | 0 0 0 0 0 0 0 32 80 112 136 112 80 32 0 |
| model projection(t): | 0 0 0 0 0 0 0 32 80 112 136 112 80 32 0 |
| query projection(u): | 0 8 20 28 34 80 112 136 34 80 32 28 34 28 20 8 |
| model projection(u): | 0 8 20 32 80 112 136 112 34 32 20 28 34 28 20 8 |
| query projection(v): | 8 20 28 34 28 20 8 20 28 34 28 20 8 0 0 0 |
| model projection(v): | 8 20 28 34 28 20 8 20 28 34 28 20 8 0 0 0 |
| query projection(w): | 0 0 0 0 16 40 56 68 56 40 20 28 34 28 20 8 |
| model projection(w): | 0 0 0 16 40 56 68 56 40 16 20 28 34 28 20 8 |
| query projection(x): | 8 20 28 34 28 20 8 20 28 34 28 20 8 0 0 0 |
| model projection(x): | 8 20 28 34 28 20 8 20 28 34 28 20 8 0 0 0 |
| query projection(y): | 0 0 0 0 0 16 40 56 68 56 40 34 28 20 8 0 |
| model projection(y): | 0 0 0 0 0 16 40 56 68 56 40 34 28 20 8 0 |
| query projection(z): | 8 20 28 34 28 20 8 20 28 34 28 20 8 0 0 0 |
| model projection(z): | 8 20 28 34 28 20 8 20 28 34 28 20 8 0 0 0 |

In this example, additional letters are tested because the cluster table is chosen. For example, the letter "a" is a core letter for the letters "e", "o", "s", and "i". The letter "c" is a core letter for the letters "s", "k", "x", "v", and "z". Therefore, the additional letters "b", "k", "p", "r", "s", "v", "w", "x", "y", and "z" are analyzed in addition to the letters in "communicate".

Referring to the results above, there are two peaks for the letter "k", corresponding to the position of the letter "c" in "communicate". This is because "k" is in the cluster of the letter "c". There are also two peaks for each of the letters "s", "v", "x", and "z", all cluster letters of the letter "c". The peaks for these letters are smaller than that for the letter "k" because their match weight is lower.

EXAMPLE 3

This example uses the position weight table, but not the cluster table. The position weight table is given by: {2, 2, 1, 1, 1, 1, 1, 1, 1}. This means that the first two characters are given twice the weight as the remaining characters. This is because most spelling mistakes are made at the beginning of a word as opposed to the middle or end of a word. Distribution table number 2 is used.

query: communicate model: communicate degree(maximum is 34) 32 similarity: 94.117645%:

| | |
|---|---|
| query projection(a): | 0 0 0 0 0 0 4 10 14 17 14 10 4 0 0 |
| model projection(a): | 0 0 0 0 0 0 4 10 14 17 14 10 4 0 0 |
| query projection(c): | 8 20 28 34 28 20 8 10 14 17 14 10 4 0 0 0 |
| model projection(c): | 8 20 28 34 28 20 8 10 14 17 14 10 4 0 0 0 |
| query projection(e): | 0 0 0 0 0 0 0 0 4 10 14 17 14 10 4 |
| model projection(e): | 0 0 0 0 0 0 0 0 4 10 14 17 14 10 4 |
| query projection(i): | 0 0 0 0 4 10 14 17 14 10 4 0 0 0 0 |
| model projection(i): | 0 0 0 0 4 10 14 17 14 10 4 0 0 0 0 |
| query projection(m): | 0 0 4 10 14 17 17 14 10 4 0 0 0 0 0 0 |
| model projection(m): | 0 0 4 10 14 17 14 10 4 0 0 0 0 0 0 |
| query projection(n): | 0 0 0 0 0 4 10 14 17 14 10 4 0 0 0 0 |
| model projection(n): | 0 0 0 0 4 10 14 17 14 10 4 0 0 0 0 |
| query projection(o): | 0 8 20 28 34 28 20 8 0 0 0 0 0 0 0 |
| model projection(o): | 0 8 20 28 34 28 20 8 0 0 0 0 0 0 0 |
| query projection(t): | 0 0 0 0 0 0 0 0 4 10 14 17 14 10 4 0 |
| model projection(t): | 0 0 0 0 0 0 0 0 4 10 14 17 14 10 4 0 |
| query projection(u): | 0 0 0 4 10 14 17 14 10 4 0 0 0 0 0 0 |
| model projection(u): | 0 0 0 4 10 14 17 14 10 4 0 0 0 0 0 0 |

The influence of the position weight table is seen in that the peaks for the first two letters, namely "c" and "o", are twice that of the peaks for the remaining letters, (34-17). Also note that the second occurrence of the letter "c" has only a peak of 17, versus the peak of 34 of the first occurrence.

EXAMPLE 4

This example uses both a cluster table and a position weight table. The effect of the cluster table is shown by the additional cluster letters that are analyzed. The effect of the position weight table is shown for the letter "c" and "o", where the peak values are twice as high as for the other letters, (272-136). In addition, the first peaks for the cluster letters for "c", ("s", "k", "x", "v", and "z"), are twice as high as the second peak, illustrating the effect of the position weight table. The peaks for cluster letters for "o", ("u", "e", "a", "i", and "p"), are higher due to the position weight table.

query: communicate model: communicate degree(maximum is 272) 263 similarity: 96.691177%:

| | |
|---|---|
| query projection(a): | 0 16 40 56 68 56 40 56 80 112 136 112 51 42 30 12 |
| model projection(a): | 0 16 40 56 68 56 40 56 80 112 136 112 51 42 30 12 |
| query projection(b): | 0 0 0 0 0 8 20 28 34 28 20 8 0 0 0 0 |
| model projection(b): | 0 0 0 0 8 20 28 34 28 20 8 0 0 0 0 0 |
| query projection(c): | 64 160 224 272 224 160 64 80 112 136 112 80 32 0 0 0 |
| model projection(c): | 64 160 224 272 224 160 64 80 112 136 112 80 32 0 0 0 |
| query projection(e): | 0 24 60 84 102 84 60 42 51 56 68 84 102 84 60 24 |
| model projection(e): | 0 24 60 84 102 84 34 42 51 56 68 84 102 84 60 24 |
| query projection(i): | 0 24 60 84 102 84 80 112 136 112 68 56 51 42 30 12 |
| model projection(i): | 0 24 60 84 102 84 80 112 136 112 68 56 51 42 30 12 |
| query projection(k): | 32 80 112 136 112 80 32 40 56 68 56 40 16 0 0 0 |
| model projection(k): | 32 80 112 136 112 80 32 40 56 68 56 40 16 0 0 0 |
| query projection(m): | 0 0 32 80 112 136 136 112 34 32 20 8 0 0 0 0 |
| model projection(m): | 0 0 32 80 112 136 112 34 32 20 8 0 0 0 0 0 |
| query projection(n): | 0 0 16 40 56 68 80 112 136 112 80 32 0 0 0 0 |
| model projection(n): | 0 0 16 40 56 80 112 136 112 80 32 0 0 0 0 0 |
| query projection(o): | 0 64 160 224 272 224 160 34 34 28 34 28 34 28 20 8 |
| model projection(o): | 0 64 160 224 272 224 34 64 34 28 34 28 34 28 20 8 |
| query projection(p): | 0 16 40 56 68 56 40 16 0 0 0 0 0 0 0 0 |
| model projection(p): | 0 16 40 56 68 56 40 16 0 0 0 0 0 0 0 0 |
| query projection(r): | 0 0 0 0 0 0 0 0 8 20 28 34 34 28 20 8 |
| model projection(r): | 0 0 0 0 0 0 0 0 8 20 28 34 34 28 20 8 |
| query projection(s): | 32 80 112 136 112 80 32 40 56 68 34 40 20 8 0 0 |
| model projection(s): | 32 80 112 136 112 80 32 40 56 68 34 40 20 8 0 0 |
| query projection(t): | 0 0 0 0 0 0 0 32 80 112 136 112 80 32 0 |
| model projection(t): | 0 0 0 0 0 0 0 32 80 112 136 112 80 32 0 |
| query projection(u): | 0 16 40 56 68 80 112 136 34 80 32 28 34 28 20 8 |
| model projection(u): | 0 16 40 56 80 112 136 112 34 32 20 28 34 28 20 8 |
| query projection(v): | 16 40 56 68 56 40 16 20 28 34 28 20 8 0 0 0 |
| model projection(v): | 16 40 56 68 56 40 16 20 28 34 28 20 8 0 0 0 |
| query projection(w): | 0 0 0 0 16 40 56 68 56 40 20 28 34 28 20 8 |
| model projection(w): | 0 0 0 16 40 56 68 56 40 16 20 28 34 28 20 8 |
| query projection(x): | 16 40 56 68 56 40 16 20 28 34 28 20 8 0 0 0 |
| model projection(x): | 16 40 56 68 56 40 16 20 28 34 28 20 8 0 0 0 |
| query projection(y): | 0 0 0 0 0 16 40 56 68 56 40 34 28 20 8 0 |
| model projection(y): | 0 0 0 0 0 16 40 56 68 56 40 34 28 20 8 0 |
| query projection(z): | 16 40 56 68 56 40 16 20 28 34 28 20 8 0 0 0 |
| model projection(z): | 16 40 56 68 56 40 16 20 28 34 28 20 8 0 0 0 |

EXAMPLE 5

This example illustrates a comparison of "communicate" and "communicate" without cluster table and without position weights, but using distribution table number 1.

query: communicate model: communicate degree(maximum is 21) 20 similarity: 95.238098%:

| | |
|---|---|
| query projection(a): | 0 0 0 0 0 0 4 10 14 17 19 21 19 17 14 10 4 0 0 |
| model projection(a): | 0 0 0 0 0 0 4 10 14 17 19 21 19 17 14 10 4 0 0 |
| query projection(c): | 4 10 14 17 19 21 19 17 14 17 19 21 19 17 14 10 4 0 0 0 |
| model projection(c): | 4 10 14 17 19 21 19 17 14 17 19 21 19 17 14 10 4 0 0 0 |
| query projection(e): | 0 0 0 0 0 0 0 0 4 10 14 17 19 21 19 17 14 10 4 |
| model projection(e): | 0 0 0 0 0 0 0 0 4 10 14 17 19 21 19 17 14 10 4 |
| query projection(i): | 0 0 0 0 4 10 14 17 19 21 19 17 14 10 4 0 0 0 0 |
| model projection(i): | 0 0 0 0 4 10 14 17 19 21 19 17 14 10 4 0 0 0 0 |
| query projection(m): | 0 0 4 10 14 17 19 21 21 19 17 14 10 4 0 0 0 0 0 0 |
| model projection(m): | 0 0 4 10 14 17 19 21 19 17 14 10 4 0 0 0 0 0 0 0 |
| query projection(n): | 0 0 0 0 0 4 10 14 17 19 21 19 17 14 10 4 0 0 0 0 |
| model projection(n): | 0 0 0 0 4 10 14 17 19 21 19 17 14 10 4 0 0 0 0 0 |
| query projection(o): | 0 4 10 14 17 19 21 19 17 14 10 4 0 0 0 0 0 0 0 0 |
| model projection(o): | 0 4 10 14 17 19 21 19 17 14 10 4 0 0 0 0 0 0 0 0 |
| query projection(t): | 0 0 0 0 0 0 0 0 4 10 14 17 19 21 19 17 14 10 4 0 |
| model projection(t): | 0 0 0 0 0 0 0 0 4 10 14 17 19 21 19 17 14 10 4 0 |
| query projection(u): | 0 0 0 0 4 10 14 17 19 21 19 17 14 10 4 0 0 0 0 0 |
| model projection(u): | 0 0 0 4 10 14 17 19 21 19 17 14 10 4 0 0 0 0 0 0 |

EFFECTS OF OPTIONAL TABLES

If a word such as "communicate" is misspelled as "communicate", generally we may say that these two words have 1 character different out of 11 characters. Thus, "communicate" is 91% similar to "communicate". However, the actual similarity of the two words is higher. Using the present invention, with cluster tables, position weights and distribution table number 1, the similarity becomes approximately 97%.

Now compare the result of comparing "communicate" with "communikate" and "communigate". With cluster table above, a better similarity comes out when "communicate" is compared with "communikate" than compared with "communigate" (94.3% vs 91.7%). It means that "communikate" is more likely to be "communicate" than "communigate" is, since "k" and "c" sometimes may have same pronunciation, and "k" is in the cluster of "c". With the position weight table a better similarity (94.3% vs 92.2%) is achieved while comparing "communicate" with "communikate".

Figure 3:
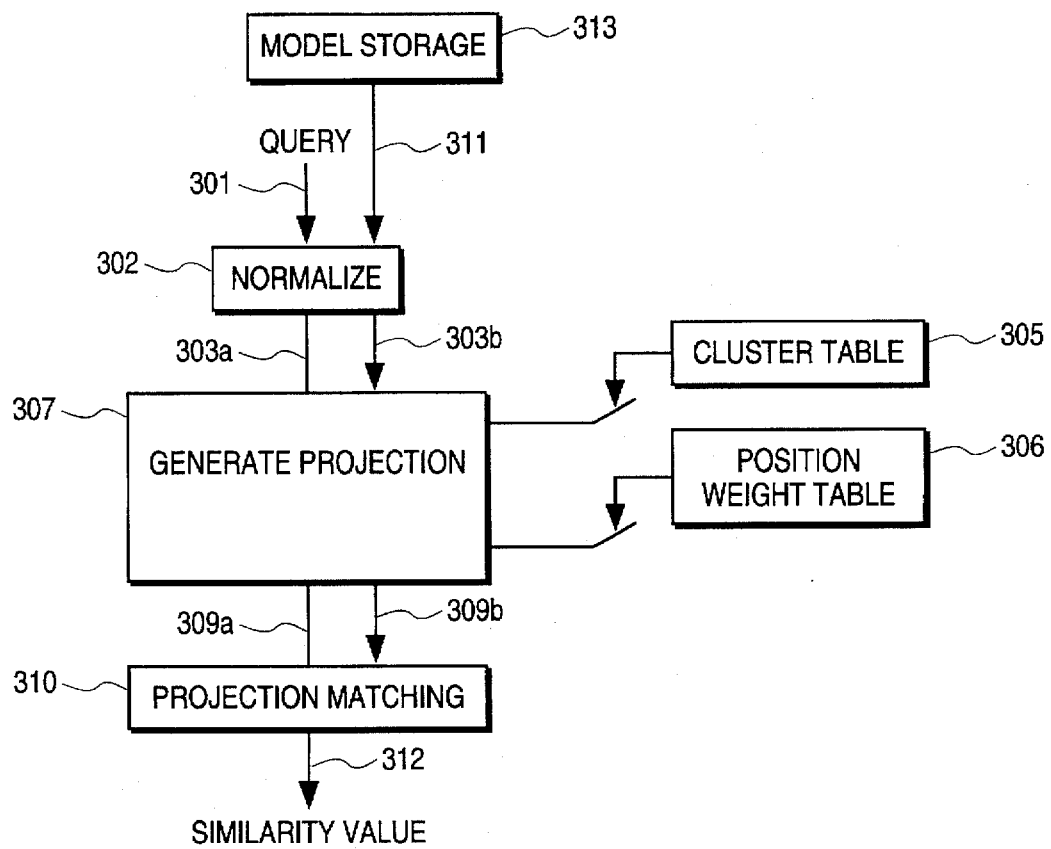
FIG. 3 is a block diagram illustrating the preferred embodiment of the present invention.

A block diagram of the preferred embodiment of the present invention is illustrated in FIG. 3. A query string 301 is provided to normalizing block 302. Model vectors from model storage 313 are provided to normalizing block 302 on line 311. The normalizing block 302 normalizes the data string of S symbols into a normalized image of N symbols. The normalized image 303A of the query and the normalized image 303B of the model vector are provided to the projection generating block 304.

A first memory means 305 for storing a cluster table is switchably coupled to projection generating means 304 through switch 307. A second memory means 306 for storing a position weight table is switchably coupled to projection generating means 304 through switch 308. Switches 307 and 308 can be independently controlled so that the projection vector 309 generated by projection generating block 304 may optionally include the effect of the cluster table 305 and/or the position weight table 306.

The projection vector 309A of the normalized query 303A, and the projection vector 309B of the normalized model vector 303B, are provided to projection matching block 309. The projection matching block 310 generates a similarity value 312, representing the degree of similarity between the projection vector 309A of the query and the projection vector 309B of the model vector. The projection matching block 310 operates in accordance with the algorithm:

$$\Theta(P_1, P_2) = 1 - \frac{\Sigma |p_{1i} - p_{2i}|}{\Sigma p_{1i} + \Sigma p_{2i}}$$

where $P_1$ and $P_2$ are two projections to be compared. When two projections are identical, or two original strings are identical, the similarity is 1. The lowest possible $\Theta$ is 0.

The first, second, and third memory means of FIG. 3 can be implemented as three address regions in a single memory. In addition, the apparatus of FIG. 3 can be implemented on a processor as a plurality of processor executable instructions.

Thus, a method and apparatus for comparing data strings has been described.

APPENDIX A

```
*       zfmpopen - Projection Matching: open a ZFMP structure
* DESCRIPTION
*       allocate and initialize zfmpenv structure
*/
zfmpref *
zfmpopen(size, maxsim, poswts, dist, clusters)
reg6    eword    size;
reg12   eword    maxsim;
reg8    ub2      *poswts;
reg7    ub2      *dist;
reg13   zfmpclut *clusters;
{
    reg0    zfmpenv  *pe_p; /* pointer to return */
    reg1    eword    i;
    /* following variables are calculated from the parameters */
    reg4    eword    neighbors;
    reg5    eword    closure;
```

APPENDIX A-continued

```
    reg10   eword    npos;
    /* We use array indexes instead of pointers, because we don't
       want to destroy dist and poswts. The overhead is minor
       since zfmpopen is only called once for each session. */
    for (i = 0; dist[i]; ++i); /* [sic] how many neighbors */
    neighbors = i - 1;
    for (i = 0; poswts[i]; ++i); /* [sic] how many positions */
    closure = i + neighbors * 2;
    npos    = i;
#ifdef DEBUG
    printf("neighbors = %d, closure = %d, npos = %d\n",
        neighbors, closure, npos);
    printf ("dist[ ]: ");
    for (i = 0; i < neighbors + 1; ++i) printf("%d ", dist[i]);
    printf("\nposwts[ ]: ");
    for (i = 0; i < npos; ++i) printf("%d, ", poswts[i]);
    printf ("\n");
#endif
    /* allocate ZFMP environment */
    if (!(pe_p = (zfmpenv *)malloc(sizeof(zfmpenv))))
    {
        return ((zfmpref *)0);
    }
    pe_p->pe_size       = size;
    pe_p->pe_maxsim     = maxsim;
    pe_p->pe_closure    = closure;
    pe_p->pe_neighbors  = neighbors;
    pe_p->pe_npos       = npos;
    pe_p->pe_dist       = dist;
    pe_p->pe_poswts     = poswts;
    pe_p->pe_clusters   = clusters;
    pe_p->pe_qprojs     = 0;
    pe_p->pe_mprojs     = 0;
    /* allocate memory */
    if (!(pe_p->pe_qprojs = (ub2 *)malloc(sizeof(ub2) * size * closure))
    ||
    !(pe_p->pe_mprojs = (ub2 *)malloc(sizeof(ub2) * size * closure)))
    {
        zfmpclose ((zfmpref *) pe_p);
        return ((zfmpref *)0);
    }
    /* cast and return */
    return ((zfmpref *)pe_p);
}
```

APPENDIX B

```
* NAME
*       zfmpquery - Projection Matching: set a query
* DESCRIPTION
*       set the query to the string given and generate its projections
*/
void
zfmpquery(pe_h, query, qlen)
reg0    zfmpref *pe_h;
reg1    text    *query;
reg2    eword   qlen;
```

APPENDIX B-continued

```
{
    /* do projections */
    zfmp_c(pe_h)->pe_qsum = zfmprojs(zfmp_c(pe_h),   query,
                                                    qlen,
                                                    zfmp_c(pe_h)->pe_qprojs);
#ifdef DEBUG
    {
        int i, j;
        int qsum;
        qsum = 0;
        for (i = 0; i < zfmp_c(pe_h)->pe_size; ++i)
        {
            printf("%c: ", i + 'a');
            for (j = 0; j < zfmp_c(pe_h)->pe_closure; ++j)
            {
                printf("%d ", zfmp_c(pe_h)->pe_qprojs[i] [j]);
                                qsum += zfmp_c(pe_h)->pe_qprojs[i] [j];
            }
            printf("\n");
        }
        printf("pe_qsum = %d, qsum = %d\n", zfmp_c(pe_h)->pe_qsum, qsum);
    }
#endif
}
```

APPENDIX C

```
* NAME
*       zfmpmodel - compute the similarity index
* DESCRIPTION
*       generate projections for the model and compare the projections
*       to those of query
*/
eword
zfmpmodel(pe_h, model, mlen)
reg0    zfmpref     *pe_h;
reg11   text        *model;
reg12   eword       mlen;
{
    reg6    eword   i;
    reg7    ub4     sigma;      /* total of projections */
    reg9    eword   delta;      /* difference between two projections */
    reg8    ub2     *qprojs;    /* projections from zfmpenv */
    reg5    ub2     *mprojs;
    /* geb pointers */
    qprojs  = zfmp_c(pe_h)->pe_qprojs;
    mprojs  = zfmp_c(pe_h)->pe_mprojs;
    /* do projections for the model and get the sigma */
    sigma = (ub4)zfmp_c(pe_h)->pe_qsum +
            zfmprojs(zfmp_c(pe_h), model,
                                        mlen,
                                        mprojs);
    /* calculate the difference */
    delta = (eword)0;
    for (i = zfmp_c(pe_h)->pe_size * zfmp_c(pe_h)->pe_closure;
    i;
         --i, ++qprojs, ++mprojs)
    {
        delta += *qprojs > *mprojs? (eword)*qprojs - *mprojs:
                                    (eword)*mprojs - *qprojs;
    }
    return ((eword) ((sigma - delta) * (zfmp_c(pe_h)->pe_maxsim) /
sigma));
}
```

I claim:

1. In a computer system having a processing means coupled to a storage means and a display means, a computer-implemented method of comparing, in a database application, a first string of digitally represented characters with a second string of digitally represented characters, each character of said first and second string of digitally represented characters being a member of a set of digitally represented characters, said computer-implemented method comprising the steps of:

using said processing means, normalizing said first string of S known digitally represented characters to create a first normalized string of N normalized symbols and normalizing said second string of known digitally represented characters to create a second normalized string of N normalized symbols;

storing said first normalized string and said second normalized string in said storage means;

using said processing means, generating a first projection from said first normalized string and a second projection from said second normalized string;

storing said first projection and said second projection in said storage means; and using said processing means, retrieving said first and second projections from said storage means and comparing said first projection and said second projection to determine a degree of similarity of said first and second projections.

2. The computer implemented method of claim 1 wherein said set of digitally represented characters is a set of ASCII characters.

3. The computer implemented method of claim 1 wherein said set of digitally represented characters is a set of symbols.

4. The computer implemented method of claim 1 wherein said steps of generating said first projection and said second projection further include the step of using cluster tables for generating said first projection and said second projection.

5. The computer implemented method of claim 1 wherein said steps of generating said first projection and said second projection further include the step of using position weight tables for generating said first projection and said second projection.

6. The computer implemented method of claim 1 wherein said steps of generating said first projection and said second projection further include the step of using cluster tables and position weight tables for generating said first projection and said second projection.

7. The computer implemented method of claim 1 wherein said steps of normalizing said first string and said second string further include the step of generating a medium of a symbol, M, in a normalized image by:

$$M(S_i) = i * |N|/|S|$$

where $S_i$ is the i-th symbol in a string S, $|N|$ is the normalized size, and $|S|$ is the length of string S.

8. The computer-implemented method of claim 1 wherein said step of generating said first projection and said second projection is accomplished by projecting said first string and said second string onto a first and second closure in a normal distribution by:

$$C_{s_jM(S_i)+|D|+j} = d_j$$

$$C_{s_jM(S_i)+|D|+j} = d_j \ (j=0,1,2,\ldots,|D|-1)$$

where D is a distributing series, $|D|$ is distribution size, $d_j$ is the j-th item in distribution series D, and $Cs_{ik}$ is the k-th item in symbol $S_i$'s closure.

9. The computer implemented method of claim 4 wherein said step of generating said projection of said first string and said second string using cluster tables is accomplished by:

$$C_{s_jM(S_i)+|D|+j} = d_j * us_{in}$$

$$C_{s_jM(S_i)+|D|+j} = d_j * us_{in} \ (j=0,1,2,\ldots,|D|-1)$$

where D is a distributing series, $|D|$ is distribution size, $d_j$ is the j-th item in distribution series D, $Cs_{ik}$ is the k-th item in symbol $S_i$'s closure, and $us_{in}$ is weight of symbol n in the cluster whose core is $S_i$.

10. The computer implemented method of claim 5 wherein said step of generating said projection of said first string and said second string using position weight tables is accomplished by $$C_{s_jM(S_i)+|D|+j} = d_j * W_{M(S_i)}$$

$$C_{s_jM(S_i)+|D|+j} = d_j * W_{M(S_i)} \ (j=0,1,2,\ldots,|D|-1)$$

where D is a distributing series, $|D|$ is distribution size, $d_j$ is the j-th item in distribution series D, $C_{S_{ik}}$ is the k-th item in symbol $S_i$'s closure and $W_{M(S_i)}$ is a weight on position $M(S_i)$.

11. The computer-implemented method of claim 6 wherein said step of generating said projection of said first string and said second string using cluster tables and weight tables is accomplished by:

$$C_{s_jM(S_i)+|D|+j} = d_j * W_{M(S_i)} * us_{jt}$$

$$C_{s_jM(S_i)+|D|+j} = d_j * W_{M(S_i)} * us_{jt} \ (j=0,1,2,\ldots,|D|-1)$$

where D is a distributing series, $|D|$ is distribution size, $d_j$ is the j-th item in distribution series D, $C_{S_{ik}}$ is the k-th item in symbol $S_i$'s closure, $u_{s_{jt}}$ is a cluster weight, and $W_{M(S_i)}$ is a position weight.

12. A computer apparatus for comparing, in a database application, a first string of digitally represented characters with a second string digitally represented characters, each character of said first and second string of digitally represented characters being a member of a set of digitally represented characters, said computer apparatus comprising:

a storage means;

a processing means coupled to said storage means, said processing means including:

a means for normalizing a first string of S known digitally represented characters to create a first normalized string of N normalized symbols and for normalizing a second string of known digitally represented characters to create a second normalized string of N normalized symbols;

a means for storing said first normalized string and said second normalized string;

a means for generating a first projection from said first normalized string and a second projection from said second normalized string;

a means for storing said first projection and said second projection in said storage means;

a means for retrieving said first and second projections from said storage means; and a means for comparing said first projection and said second projection to determine a degree of similarity of said first and second projections.

13. The computer apparatus of claim 12 wherein said set of digitally represented characters is a set of ASCII characters.

14. The computer apparatus of claim 12 wherein said set of digitally represented characters is a set of symbols.

15. The computer apparatus of claim 12 wherein said means for generating said first projection and said second projection uses cluster tables.

16. The computer apparatus of claim 12 wherein said means for generating said first projection and said second projection uses position weight tables.

17. The computer apparatus of claim 12 wherein said means for generating said first projection and said second projection uses cluster tables and position weight tables.

18. The computer apparatus of claim 12 wherein said means for normalizing said first string and said second string generates a medium of a symbol, M, in a normalized image by:

$$M(S_i) = i * |N|/|S|$$

where $S_i$ is the i-th symbol in a string S, $|N|$ is the normalized size, and $|S|$ is the length of string S.

19. The computer apparatus of claim 12 wherein said means for generating said projection of said first string and said second string is accomplished by projecting said first string and said second string onto a first and a second closure in a normal distribution by:

$$C_{s_jM(S_i)+|D|+j} = d_j$$

$$C_{s_jM(S_i)+|D|+j} = d_j \ (j=0,1,2,\ldots,|D|-1)$$

where D is a distributing series, $|D|$ is distribution size, $d_j$ is the j-th item in distribution series D, and $C_{S_{ik}}$ is the k-th item in symbol $S_i$'s closure.

20. The computer apparatus of claim 15 wherein said means for generating said projection of said first string and said second string uses said cluster tables by:

$$C_{s_jM(S_i)+|D|+j} = d_j * us_{jt}$$

$$C_{s_jM(S_i)+|D|+j} = d_j * us_{jt} \ (j=0,1,2,\ldots,|D|-1)$$

where D is a distributing series, $|D|$ is distribution size, $d_j$ is the j-th item in distribution series D, $C_{S_{ik}}$ is the k-th item in symbol $S_i$'s closure, and $u_{s_{jt}}$ is a cluster weight.

21. The computer apparatus of claim 16 wherein said processing means for generating said projection of said first string and said second string uses position weight tables by:

$$C_{s_jM(S_i)+|D|+j} = d_j * W_{M(S_i)}$$

$$C_{s_jM(S_i)+|D|+j} = d_j * W_{M(S_i)} \ (j=0,1,2,\ldots,|D|-1)$$

where D is a distributing series, $|D|$ is distribution size, $d_j$ is the j-th item in distribution series D, $C_{S_{ik}}$ is the k-th item in symbol $S_i$'s closure and $u_{s_{jt}}$ is a position weight.

22. The computer apparatus of claim 17 wherein said means for generating said projection of said first string and said second string uses said cluster tables and said position weight tables by:

$$C_{s_iM(S_i)+|D|+j}=d_j*W_{M(s_i)}*u_{s_{j'}}$$

$$C_{s_iM(S_i)+|D|-j}=d_j*W_{M(s_i)}*u_{s_{j'}} \; (j=0,1,2,\ldots,|D|-1)$$

where D is a distributing series, |D| is distribution size, $d_j$ is the j-th item in distribution series D, $C_{S_{ik}}$ is the k-th item in symbol $S_i$'s closure, $u_{s_{j'}}$ is a cluster weight, and $W_{M(s_i)}$ is a position weight.

23. A computer-readable medium having stored thereon a plurality of sequences of instructions for a database application, said plurality of sequences of instructions including sequences of instructions which, when executed by a processor, cause the processor to perform the steps of:

normalizing a first string of S known digitally represented characters to create a first normalized string of N normalized symbols and normalize a second string of known digitally represented characters to create a second normalized string of N normalized symbols;

storing said first normalized string and said second normalized string;

generating a first projection from said first normalized string and a second projection from said second normalized string;

causing said processing means to store said first projection and said second projection;

retrieving said first and second projections from said storage means; and comparing said first projection and said second projection to determine a degree of similarity of said first and second projections.

24. The computer-readable medium of claim 23 wherein said step of generating said first projection and said second projection uses cluster tables.

25. The computer-readable medium of claim 23 wherein said step of generating said first projection and said second projection uses position weight tables for generating said first projection and said second projection.

26. The computer-readable medium of claim 23 wherein said step of generating said first projection and said second projection uses cluster tables and position weight tables for generating said first projection and said second projection.

27. The computer-readable medium of claim 23 wherein said step of normalizing said first string and said second string generates a medium of a symbol, M, in a normalized image by:

$$M(S_i)=i*|N|/|S|$$

where $S_i$ is the i-th symbol in a string S, |N| is the normalized size, and |S| is the length of string S.

28. The computer-readable medium of claim 23 wherein said step of generating said projection of said first string and said second string is accomplished by projecting said first string and said second string onto a first and a second closure in a normal distribution by:

$$C_{s_iM(S_i)+|D|+j}=d_j$$

$$C_{s_iM(S_i)+|D|-j}=d_j \; (j=0,1,2,\ldots,|D|-1)$$

where D is a distributing series, |D| is distribution size, $d_j$ is the j-th item in distribution series D, and $C_{S_{ik}}$ is the k-th item in symbol $S_i$'s closure.

29. The computer-readable medium of claim 24 wherein said step of generating said projection of said first string and said second string uses said cluster tables by:

$$C_{s_iM(S_i)+|D|+j}=d_j*u_{s_{j'}}$$

$$C_{s_iM(S_i)+|D|-j}=d_j*u_{s_{j'}} \; (j=0,1,2,\ldots,|D|-1)$$

where D is a distributing series, |D| is distribution size, $d_j$ is the j-th item in distribution series D, $C_{S_{ik}}$ is the k-th item in symbol $S_i$'s closure, and $u_{s_{j'}}$ is a cluster weight.

30. The computer-readable medium of claim 25 wherein said step of generating said projection of said first string and said second string uses said position weight tables by:

$$C_{s_iM(S_i)+|D|+j}=d_j*W_{M(s_i)}$$

$$C_{s_iM(S_i)+|D|-j}=d_j*W_{M(s_i)} \; (j=0,1,2,\ldots,|D|-1)$$

where D is a distributing series, |D| is distribution size, $d_j$ is the j-th item in distribution series D, $C_{S_{ik}}$ is the k-th item in symbol $S_i$'s closure and $u_{s_{j'}}$ is a position weight.

31. The computer-readable medium of claim 26 wherein said step of generating said projection of said first string and said second string uses said cluster tables and said position weight tables by:

$$C_{s_iM(S_i)+|D|+j}=d_j*W_{M(s_i)}*u_{s_{j'}}$$

$$C_{s_iM(S_i)+|D|-j}=d_j*W_{M(s_i)}*u_{s_{j'}} \; (j=0,1,2,\ldots,|D|-1)$$

where D is a distributing series, |D| is distribution size, $d_j$ is the j-th item in distribution series D, $C_{S_{ik}}$ is the k-th item in symbol $S_i$'s closure, $u_{s_{j'}}$ is a cluster weight, and $W_{M(s_i)}$ is a position weight.

32. In a computer system having a processing means coupled to a storage means and a display means, a computer-implemented method of comparing, in a spell checking application, a first string of digitally represented characters with a second string of digitally represented characters, each character of said first and second string of digitally represented characters being a member of a set of digitally represented characters, said computer-implemented method comprising the steps of:

using said processing means, normalizing said first string of S known digitally represented characters to create a first normalized string of N normalized symbols and normalizing said second string of known digitally represented characters to create a second normalized string of N normalized symbols;

storing said first normalized string and said second normalized string in said storage means;

using said processing means, generating a first projection from said first normalized string and a second projection from said second normalized string;

storing said first projection and said second projection in said storage means; and using said processing means, retrieving said first and second projections from said storage means and comparing said first projection and said second projection to determine a degree of similarity of said first and second projections.

33. The computer implemented method of claim 32 wherein said set of digitally represented characters is a set of ASCII characters.

34. The computer implemented method of claim 32 wherein said set of digitally represented characters is a set of symbols.

35. The computer implemented method of claim 32 wherein said steps of generating said first projection and said second projection further include the step of using cluster tables for generating said first projection and said second projection.

36. The computer implemented method of claim 32 wherein said steps of generating said first projection and said second projection further include the step of using position weight tables for generating said first projection and said second projection.

37. The computer implemented method of claim 32 wherein said steps of generating said first projection and said second projection further include the step of using cluster tables and position weight tables for generating said first projection and said second projection.

38. The computer implemented method of claim 32 wherein said steps of normalizing said first string and said second string further include the step of generating a medium of a symbol, M, in a normalized image by:

$$M(S_i) = i * |N|/|S|$$

where $S_i$ is the i-th symbol in a string S, |N| is the normalized size, and |S| is the length of string S.

39. The computer-implemented method of claim 32 wherein said step of generating said first projection and said second projection is accomplished by projecting said first string and said second string onto a first and second closure in a normal distribution by:

$$C_{s_iM(S_i)+|D|+j} = d_j$$

$$C_{s_iM(S_i)+|D|-j} = d_j \; (j=0,1,2,\ldots,|D|-1)$$

where D is a distributing series, |D| is distribution size, $d_j$ is the j-th item in distribution series D, and $Cs_{i_k}$ is the k-th item in symbol $S_i$'s closure.

40. The computer implemented method of claim 35 wherein said step of generating said projection of said first string and said second string using cluster tables is accomplished by:

$$C_{s_iM(S_i)+|D|+j} = d_j * us_{i_n}$$

$$C_{s_iM(S_i)+|D|-j} = d_j * us_{i_n} \; (j=0,1,2,\ldots,|D|-1)$$

where D is a distributing series, |D| is distribution size, $d_j$ is the j-th item in distribution series D, $C_{S_{i_k}}$ is the k-th item in symbol $S_i$'s closure, and $us_{i_n}$ is weight of symbol n in the cluster whose core is $S_i$.

41. The computer implemented method of claim 36 wherein said step of generating said projection of said first string and said second string using position weight tables is accomplished by $$C_{s_iM(S_i)+|D|+j} = d_j * W_{M(S_i)}$$

$$C_{s_iM(S_i)+|D|-j} = d_j * W_{M(S_i)} \; (j=0,1,2,\ldots,|D|-1)$$

where D is a distributing series, |D| is distribution size, $d_j$ is the j-th item in distribution series D, $C_{S_{i_k}}$ is the k-th item in symbol $S_i$'s closure and $W_{M(S_i)}$ is a weight on position $M(S_i)$.

42. The computer-implemented method of claim 37 wherein said step of generating said projection of said first string and said second string using cluster tables and weight tables is accomplished by:

$$C_{s_iM(S_i)+|D|+j} = d_j * W_{M(S_i)} * us_{i_n}$$

$$C_{s_iM(S_i)+|D|-j} = d_j * W_{M(S_i)} * us_{i_n} \; (j=0,1,2,\ldots,|D|-1)$$

where D is a distributing series, |D| is distribution size, $d_j$ is the j-th item in distribution series D, $C_{S_{i_k}}$ is the k-th item in symbol $S_i$'s closure, $u_{s_{i_n}}$ is a cluster weight, and $W_{M(S_i)}$ is a position weight.

43. A computer apparatus for comparing, in a spell checking application, a first string of digitally represented characters with a second string of digitally represented characters, each character of said first and second string of digitally represented characters being a member of a set of digitally represented characters, said computer apparatus comprising:

a storage means;

a processing means coupled to said storage means, said processing means including:

a means for normalizing a first string of S known digitally represented characters to create a first normalized string of N normalized symbols and for normalizing a second string of known digitally represented characters to create a second normalized string of N normalized symbols;

a means for storing said first normalized string and said second normalized string;

a means for generating a first projection from said first normalized string and a second projection from said second normalized string;

a means for storing said first projection and said second projection in said storage means;

a means for retrieving said first and second projections from said storage means; and a means for comparing said first projection and said second projection to determine a degree of similarity of said first and second projections.

44. The computer apparatus of claim 43 wherein said set of digitally represented characters is a set of ASCII characters.

45. The computer apparatus of claim 43 wherein said set of digitally represented characters is a set of symbols.

46. The computer apparatus of claim 43 wherein said means for generating said first projection and said second projection uses cluster tables.

47. The computer apparatus of claim 43 wherein said means for generating said first projection and said second projection uses position weight tables.

48. The computer apparatus of claim 43 wherein said means for generating said first projection and said second projection uses cluster tables and position weight tables.

49. The computer apparatus of claim 43 wherein said means for normalizing said first string and said second string generates a medium of a symbol, M, in a normalized image by:

$$M(S_i) = i * |N|/|S|$$

where $S_i$ is the i-th symbol in a string S, |N| is the normalized size, and |S| is the length of string S.

50. The computer apparatus of claim 43 wherein said means for generating said projection of said first string and said second string is accomplished by projecting said first string and said second string onto a first and a second closure in a normal distribution by:

$$C_{s_iM(S_i)+|D|+j} = d_j$$

$$C_{s_iM(S_i)+|D|-j} = d_j \; (j=0,1,2,\ldots,|D|-1)$$

where D is a distributing series, |D| is distribution size, $d_j$ is the j-th item in distribution series D, and $C_{S_{i_k}}$ is the k-th item in symbol $S_i$'s closure.

51. The computer apparatus of claim 46 wherein said means for generating said projection of said first string and said second string uses said cluster tables by:

$$C_{s_iM(S_i)+|D|+j}=d_j*u_{s_i}$$

$$C_{s_iM(S_i)+|D|-j}=d_j*u_{s_i} \ (j=0,1,2,\ldots,|D|-1)$$

where D is a distributing series, $|D|$ is distribution size, $d_j$ is the j-th item in distribution series D, $C_{S_{i_k}}$ is the k-th item in symbol $S_i$'s closure, and $u_{s_i}$ is a cluster weight.

52. The computer apparatus of claim 47 wherein said processing means for generating said projection of said first string and said second string uses position weight tables by:

$$C_{s_iM(S_i)+|D|+j}=d_j*W_{M(s_i)}$$

$$C_{s_iM(S_i)+|D|-j}=d_j*W_{M(s_i)} \ (j=0,1,2,\ldots,|D|-1)$$

where D is a distributing series, $|D|$ is distribution size, $d_j$ is the j-th item in distribution series D, $C_{S_{i_k}}$ is the k-th item in symbol $S_i$'s closure and $u_{s_i}$ is a position weight.

53. The computer apparatus of claim 48 wherein said means for generating said projection of said first string and said second string uses said cluster tables and said position weight tables by:

$$C_{s_iM(S_i)+|D|+j}=d_j*W_{M(s_i)}*u_{s_i}$$

$$C_{s_iM(S_i)+|D|-j}=d_j*W_{M(s_i)}*u_{s_i} \ (j=0,1,2,\ldots,|D|-1)$$

where D is a distributing series, $|D|$ is distribution size, $d_j$ is the j-th item in distribution series D, $C_{S_{i_k}}$ is the k-th item in symbol $S_i$'s closure, $u_{s_i}$ is a cluster weight, and $W_{M(s_i)}$ is a position weight.

54. A computer-readable medium having stored thereon a plurality of sequences of instructions for a spell checking application, said plurality of sequences of instructions including sequences of instructions which, when executed by a processor, cause the processor to perform the steps of:

normalizing a first string of S known digitally represented characters to create a first normalized string of N normalized symbols and normalize a second string of known digitally represented characters to create a second normalized string of N normalized symbols;

storing said first normalized string and said second normalized string;

generating a first projection from said first normalized string and a second projection from said second normalized string;

causing said processing means to store said first projection and said second projection;

retrieving said first and second projections from said storage means; and comparing said first projection and said second projection to determine a degree of similarity of said first and second projections.

55. The computer-readable medium of claim 54 wherein said step of generating said first projection and said second projection uses cluster tables.

56. The computer-readable medium of claim 54 wherein said step of generating said first projection and said second projection uses position weight tables for generating said first projection and said second projection.

57. The computer-readable medium of claim 54 wherein said step of generating said first projection and said second projection uses cluster tables and position weight tables for generating said first projection and said second projection.

58. The computer-readable medium of claim 54 wherein said step of normalizing said first string and said second string generates a medium of a symbol, M, in a normalized image by:

$$M(S_i)=i*|N|/|S|$$

where $S_i$ is the i-th symbol in a string S, $|N|$ is the normalized size, and $|S|$ is the length of string S.

59. The computer-readable medium of claim 54 wherein said step of generating said projection of said first string and said second string is accomplished by projecting said first string and said second string onto a first and a second closure in a normal distribution by:

$$C_{s_iM(S_i)+|D|+j}=d_j$$

$$C_{s_iM(S_i)+|D|-j}=d_j \ (j=0,1,2,\ldots,|D|-1)$$

where D is a distributing series, $|D|$ is distribution size, $d_j$ is the j-th item in distribution series D, and $C_{S_{i_k}}$ is the k-th item in symbol $S_i$'s closure.

60. The computer-readable medium of claim 55 wherein said step of generating said projection of said first string and said second string uses said cluster tables by:

$$C_{s_iM(S_i)+|D|+j}=d_j*u_{s_i}$$

$$C_{s_iM(S_i)+|D|-j}=d_j*u_{s_i} \ (j=0,1,2,\ldots,|D|-1)$$

where D is a distributing series, $|D|$ is distribution size, $d_j$ is the j-th item in distribution series D, $C_{S_{i_k}}$ is the k-th item in symbol $S_i$'s closure, and $u_{s_i}$ is a cluster weight.

61. The computer-readable medium of claim 56 wherein said step of generating said projection of said first string and said second string uses said position weight tables by:

$$C_{s_iM(S_i)+|D|+j}=d_j*W_{M(s_i)}$$

$$C_{s_iM(S_i)+|D|-j}=d_j*W_{M(s_i)} \ (j=0,1,2,\ldots,|D|-1)$$

where D is a distributing series, $|D|$ is distribution size, $d_j$ is the j-th item in distribution series D, $C_{S_{i_k}}$ is the k-th item in symbol $S_i$'s closure and $u_{s_i}$ is a position weight.

62. The computer-readable medium of claim 57 wherein said step of generating said projection of said first string and said second string uses said cluster tables and said position weight tables by:

$$C_{s_iM(S_i)+|D|+j}=d_j*W_{M(s_i)}*u_{s_i}$$

$$C_{s_iM(S_i)+|D|-j}=d_j*W_{M(s_i)}*u_{s_i} \ (j=0,1,2\ldots,|D|-1)$$

where D is a distributing series, $|D|$ is distribution size, $d_j$ is the j-th item in distribution series D, $C_{S_{i_k}}$ is the k-th item in symbol $S_i$'s closure, $u_{s_i}$ is a cluster weight, and $W_{M(s_i)}$ is a position weight.

\* \* \* \* \*